(12) United States Patent
Iuliano et al.

(10) Patent No.: US 11,900,122 B2
(45) Date of Patent: Feb. 13, 2024

(54) METHODS AND SYSTEMS FOR INTER-PIPELINE DATA HAZARD AVOIDANCE

(71) Applicant: Imagination Technologies Limited, Kings Langley (GB)

(72) Inventors: Luca Iuliano, Chesham (GB); Simon Nield, Wendover (GB); Yoong-Chert Foo, London (GB); Ollie Mower, Harrow (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/220,048

(22) Filed: Jul. 10, 2023

(65) Prior Publication Data
US 2023/0350689 A1 Nov. 2, 2023

Related U.S. Application Data

(63) Continuation of application No. 17/523,633, filed on Nov. 10, 2021, now Pat. No. 11,698,790, which is a
(Continued)

(30) Foreign Application Priority Data

Jun. 16, 2017 (GB) .................................. 1709598
Dec. 7, 2017 (GB) .................................. 1720408

(51) Int. Cl.
*G06F 9/30* (2018.01)
*G06F 9/38* (2018.01)

(52) U.S. Cl.
CPC .......... *G06F 9/3861* (2013.01); *G06F 9/3016* (2013.01); *G06F 9/3834* (2013.01);
(Continued)

(58) Field of Classification Search
CPC .... G06F 9/3861; G06F 9/3016; G06F 9/3834; G06F 9/3838; G06F 9/3867; G06F 9/3889
See application file for complete search history.

(56) References Cited

U.S. PATENT DOCUMENTS 5,961,630 A 10/1999 Zaidi et al.
6,065,105 A 5/2000 Zaidi et al.
(Continued)

FOREIGN PATENT DOCUMENTS

GB 2447907 A 10/2008
GB 2514618 A 12/2014
(Continued)

OTHER PUBLICATIONS

Lee et al., "Dynamically Scheduling VLIW Instructions with Dependency Information," Proceedings of the Sixth Annual Workshop on Interaction between Compilers and Computer Architectures, IEEE 2002, pp. 15-23.
(Continued)

*Primary Examiner* — Cheng Yuan Tseng
(74) *Attorney, Agent, or Firm* — Potomac Law Group, PLLC; Vincent M DeLuca

(57) ABSTRACT

Methods and parallel processing units for avoiding inter-pipeline data hazards identified at compile time. For each identified inter-pipeline data hazard the primary instruction and secondary instruction(s) thereof are identified as such and are linked by a counter which is used to track that inter-pipeline data hazard. When a primary instruction is output by the instruction decoder for execution the value of the counter associated therewith is adjusted to indicate that there is hazard related to the primary instruction, and when primary instruction has been resolved by one of multiple parallel processing pipelines the value of the counter associated therewith is adjusted to indicate that the hazard
(Continued)

related to the primary instruction has been resolved. When a secondary instruction is output by the decoder for execution, the secondary instruction is stalled in a queue associated with the appropriate instruction pipeline if at least one counter associated with the primary instructions from which it depends indicates that there is a hazard related to the primary instruction.

18 Claims, 15 Drawing Sheets

Related U.S. Application Data continuation of application No. 17/070,316, filed on Oct. 14, 2020, now Pat. No. 11,200,064, which is a continuation of application No. 16/009,358, filed on Jun. 15, 2018, now Pat. No. 10,817,301.

(52) U.S. Cl.
CPC ......... *G06F 9/3838* (2013.01); *G06F 9/3867* (2013.01); *G06F 9/3889* (2013.01)

(56) References Cited

U.S. PATENT DOCUMENTS

| | | | |
|---|---|---|---|
| 6,112,019 A | 8/2000 | Chamdani et al. | |
| 6,604,190 B1 | 8/2003 | Tran | |
| 6,711,668 B1 | 3/2004 | Wojcieszak et al. | |
| 6,715,060 B1* | 3/2004 | Arnold | G06F 9/3858 |
| | | | 712/217 |
| 6,950,927 B1 | 9/2005 | Apisdorf et al. | |
| 7,340,590 B1 | 3/2008 | Sugumar et al. | |
| 8,214,624 B2 | 7/2012 | Berglas et al. | |
| 8,407,454 B2* | 3/2013 | Berglas | G06F 9/3885 |
| | | | 712/216 |
| 8,553,489 B2* | 10/2013 | Fujisawa | G11C 8/18 |
| | | | 365/230.09 |
| 9,389,869 B2* | 7/2016 | Tran | G06F 9/324 |
| 10,176,546 B2* | 1/2019 | Nystad | G06T 15/005 |
| 10,467,010 B2 | 11/2019 | Abdallah et al. | |
| 10,817,301 B2* | 10/2020 | Iuliano | G06F 9/3834 |
| 11,200,064 B2* | 12/2021 | Iuliano | G06F 9/3838 |
| 11,698,790 B2* | 7/2023 | Iuliano | G06F 9/3889 |
| | | | 712/208 |
| 2005/0076189 A1* | 4/2005 | Wittenburg | G06F 9/3836 |
| | | | 712/217 |
| 2007/0204135 A1 | 8/2007 | Jiang | |
| 2007/0239975 A1 | 10/2007 | Wang | |
| 2007/0260856 A1* | 11/2007 | Tran | G06F 9/3885 |
| | | | 712/217 |
| 2011/0055531 A1 | 3/2011 | Bellows et al. | |
| 2022/0066781 A1 | 3/2022 | Iuliano et al. | |

FOREIGN PATENT DOCUMENTS

| WO | 87/02799 A1 | 5/1987 |
|---|---|---|
| WO | 93/20505 A2 | 10/1993 |

OTHER PUBLICATIONS

"Register Dataflow," Superscalar Microprocessor Design, Jan. 1, 1991, pp. 103-126.

* cited by examiner

METHODS AND SYSTEMS FOR INTER-PIPELINE DATA HAZARD AVOIDANCE

CROSS-REFERENCE TO RELATED APPLICATIONS AND CLAIM OF PRIORITY

This application is a continuation under 35 U.S.C. 120 of copending application Ser. No. 17/523,633 filed Nov. 10, 2021, now U.S. Pat. No. 11,698,790, which is a continuation of prior application Ser. No. 17/070,316 filed Oct. 14, 2020, now U.S. Pat. No. 11,200,064, which is a continuation of prior application Ser. No. 16/009,358 filed Jun. 15, 2018, now U.S. Pat. No. 10,817,301, which claims foreign priority under 35 U.S.C. 119 from United Kingdom Application Nos. 1709598.5 filed Jun. 16, 2017, and 1720408.2 filed Dec. 7, 2017, the contents of which are incorporated herein by reference in their entirety.

BACKGROUND OF THE INVENTION

As is known to those of skill in the art, a data hazard is created in a processing unit with an instruction pipeline when the pipelining of instructions changes the order of read and write accesses to instruction operands so that the order differs from the order that would occur from sequentially executing the instructions one-by-one.

There are three classes of data hazards: read after write (RAW); write after read (WAR); and write after write (WAW)—which are named after the ordering in the program that must be preserved by the pipeline. A RAW data hazard is the most common type of data hazard and occurs when a later instruction (with respect to the order of the instructions in the program) tries to read a source operand before an earlier instruction writes to that source operand. This results in the later instruction getting the old value of the operand. For example, if there is the following set of instructions:

$R1=R2+R3$ $R4=R1-R5$ wherein the first instruction causes the sum of the values of register 2 (R2) and register 3 (R3) to be stored in register 1 (R1) and the second instruction causes the difference between the value of register 1 (R1) and register 5 (R5) to be stored in register 4 (R4), a RAW data hazard occurs if the second instruction reads register 1 (R1) before the first instruction has written to register 1 (R1). A WAW data hazard occurs when a later instruction (with respect to the order of the instructions in the program) writes to an operand before it is written to by an earlier instruction which results in the writes being performed in the wrong order so that the operand has the value from the earlier instruction instead of the value from the later instruction. A WAR data hazard occurs when a later instruction (with respect to the order of the instructions in the program) tries to write to an operand before it is read by an earlier instruction which results in the earlier instruction reading the incorrect value.

There are many known methods, such as forwarding, for avoiding data hazards caused by a single instruction pipeline, however many processing units, such as graphics processing units (GPUs), are configured with a plurality of parallel instruction pipelines to efficiently process large amounts of data in parallel. In such parallel processing units not only do intra-pipeline hazards (i.e. hazards related to instructions that are executed in the same instruction pipeline) need to be tracked and eliminated, but inter-pipeline hazards (i.e. hazards related to instructions that are executed in different instruction pipelines) also need to be tracked and eliminated.

The embodiments described below are provided by way of example only and are not limiting of implementations which solve any or all of the disadvantages of known GPUs or parallel processing units.

SUMMARY OF THE INVENTION

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and parallel processing units for avoiding inter-pipeline data hazards where inter-pipeline data hazards are identified at compile time. For each identified inter-pipeline data hazard the primary instruction and secondary instruction(s) thereof are identified and linked by a counter used to track that inter-pipeline data hazard. When a primary instruction is output by the decoder for execution the value of the counter associated therewith is adjusted (e.g. incremented) to indicate a hazard related to that primary instruction, and when it is detected that the hazard related to that primary instruction has been resolved (e.g. the primary instruction has written data to memory) the value of the counter associated therewith is adjusted (e.g. decremented) to indicate that the hazard has been resolved. When a secondary instruction is output by the decoder for execution, the secondary instruction is stalled in a queue associated with the appropriate instruction pipeline if at least one counter associated with a primary instruction from which it depends indicates that there is a hazard related to the primary instruction.

A first aspect provides a parallel processing unit comprising: a plurality of counters; a plurality of queues, each queue preceding one instruction pipeline of a plurality of instruction pipelines; an instruction decoder configured to: decode a received instruction; in response to determining the decoded instruction is a primary instruction from which at least one other instruction is dependent on, cause a value of a counter of the plurality of counters associated with the primary instruction to be adjusted to indicate that there is a hazard related to the primary instruction; and forward the decoded instruction to one of the plurality of queues; and monitor logic configured to monitor the plurality of instruction pipelines, and in response to detecting that an instruction pipeline has resolved a hazard related to a primary instruction, cause the value of the counter associated with the primary instruction to be adjusted to indicate that the hazard related to the primary instruction has been resolved; wherein each queue is configured to, in response to receiving a secondary instruction that is dependent on one or more primary instructions, stall execution of the secondary instruction by the associated instruction pipeline if a counter associated with a primary instruction from which the secondary instruction depends indicates that there is a hazard related to that primary instruction.

A second aspect provides a method to avoid data hazards in a parallel processing unit, the method comprising: decoding, by an instruction decoder, an instruction; in response to determining at the instruction decoder that the decoded instruction is a primary instruction from which at least one other instruction is dependent on, causing a value of a counter of a plurality of counters that is associated with the primary instruction to be adjusted to indicate that there is a hazard related to the primary instruction; forwarding the decoded instruction from the instruction decoder to a queue of a plurality of queues, each queue to receive instructions to be executed by one of a plurality of instruction pipelines; in response to determining, at the queue, that a received instruction is a secondary instruction that is dependent on one or more primary instructions, stalling the secondary instruction from execution by the associated instruction pipeline if a counter associated with a primary instruction from which the secondary instruction depends indicates that there is a hazard related to the primary instruction; and in response to detecting, by monitor hardware logic, that a hazard related to a primary instruction has been resolved by an instruction pipeline of the plurality of instruction pipelines, causing the value of the counter associated with the primary instruction to be adjusted to indicate that the hazard related to the primary instruction has been resolved.

A third aspect provides a computer-implemented method of generating computer executable instructions for a parallel processing unit, the method comprising, by a processor: receiving a plurality of related instructions; identifying data hazards in the plurality of related instructions, each data hazard comprising a primary instruction and one or more secondary instructions; allocating each primary instruction a counter of a plurality of counters for tracking the identified data hazard; generating a computer executable instruction for each primary instruction that comprises information indicating the computer executable instruction is a primary instruction and information identifying the counter allocated to the primary instruction; and generating a computer executable instruction for each secondary instruction that comprises information identifying the computer executable instruction is a secondary instruction and information identifying the counter allocated to the corresponding primary instruction; and loading the computer executable instructions into the parallel processing unit.

The parallel processing units described herein may be embodied in hardware on an integrated circuit. There may be provided a method of manufacturing, at an integrated circuit manufacturing system, the parallel processing units described herein. There may be provided an integrated circuit definition dataset that, when processed in an integrated circuit manufacturing system, configures the system to manufacture the parallel processing units described herein. There may be provided a non-transitory computer readable storage medium having stored thereon a computer readable description of an integrated circuit that, when processed in an integrated circuit manufacturing system, causes the integrated circuit manufacturing system to manufacture the parallel processing units described herein.

There may be provided an integrated circuit manufacturing system comprising: a non-transitory computer readable storage medium having stored thereon a computer readable integrated circuit description that describes the parallel processing units described herein; a layout processing system configured to process the integrated circuit description so as to generate a circuit layout description of an integrated circuit embodying the parallel processing units described herein; and an integrated circuit generation system configured to manufacture the parallel processing units described herein according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings.

DETAILED DESCRIPTION OF THE INVENTION

Figure 1:
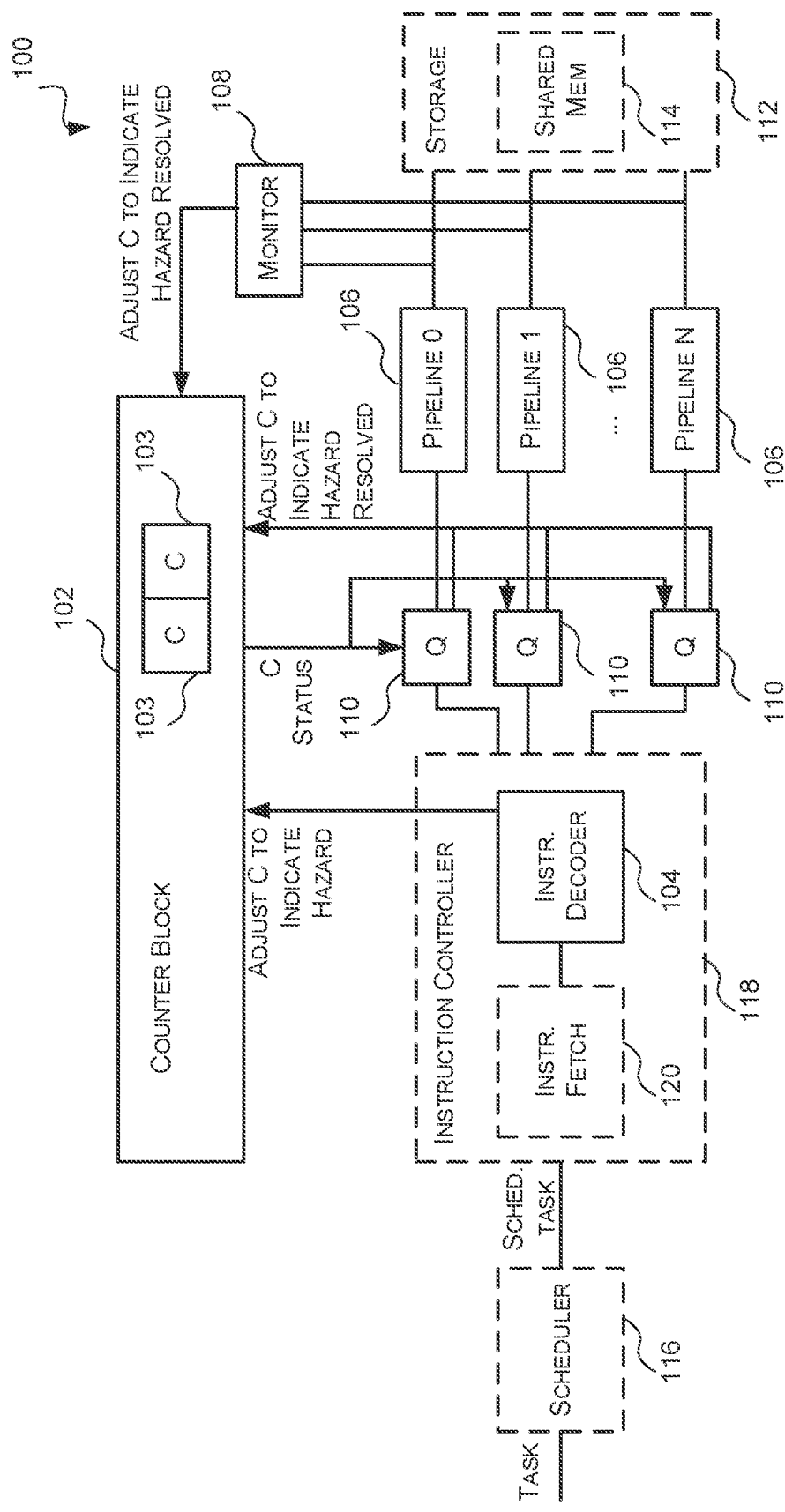
FIG. 1 is a block diagram of a first example parallel processing unit.

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, many processing units, such as GPUs, comprise a plurality of parallel instruction pipelines which are designed to efficiently process large amounts of data in parallel. For example, some processing units, may comprise a set of parallel instruction pipelines which include at least two instruction pipelines that are each optimized for a particular type (or types) of computation. Having multiple instruction pipelines that are configured to execute different types of computations allows slow or rarely used instructions to be executed in parallel with high-throughput common arithmetic operations so that the slow, or rarely used, instructions do not become a bottleneck. This also allows the Arithmetic Logic Units (ALUs) of each pipeline to be separately optimised for their particular use.

While a plurality of instruction pipelines allows for more efficient use of processing resources (e.g. Arithmetic Logic Unit (ALU) resources) and allows stalls caused by resource contention to be hidden, reordering the instructions over multiple instruction pipelines complicates tracking data hazards to ensure that instructions are performed in the correct order.

In particular, in such parallel processing units not only do intra-pipeline hazards (i.e. hazards related to instructions executed by the same pipeline) need to be tracked and eliminated, but inter-pipeline hazards (i.e. hazards related to instructions executed by different pipelines) also need to be tracked and eliminated. Specifically, since there are multiple instruction pipelines running in parallel related instructions may be in different pipelines (with different processing rates) at the same time. Accordingly, what is needed is a mechanism that ensures that if a data hazard exits between instructions executed in different pipelines that the dependent instruction will not be executed until the data hazard has cleared.

Detecting inter-pipeline data hazards solely in hardware is very costly in terms of area due to the significant number of pipeline stages that would need to be tracked and the significant number of comparisons that would be required.

Accordingly, described herein are software-controlled methods and systems for avoiding inter-pipeline data hazards in a GPU or other parallel processing units (such as for high performance computing applications) with a plurality of parallel instruction pipelines. In particular, in the methods and systems described herein inter-pipeline data hazards are identified at build time (e.g. by a compiler) and information is inserted in the instructions that identifies primary instructions (i.e. instructions from which one or more instructions in another pipeline depends) and secondary instructions (i.e. instructions that depend on one or more primary instructions in another pipeline) and links the primary and secondary instructions via a counter which is used to track the inter-pipeline data hazard and enforce the appropriate ordering of instructions.

When the instruction decoder of the parallel processing unit outputs a primary instruction for execution the associated counter is modified (e.g. incremented) to indicate that there is a hazard related to that primary instruction (i.e. that it is not safe to execute secondary instructions that are dependent on that primary instruction). When it is subsequently detected that the hazard related to that primary instruction has been resolved (e.g. the primary instruction has written data to memory) the value of the associated counter is adjusted (e.g. decremented) to indicate that the hazard related to that primary instruction has been resolved (i.e. that it is safe to execute secondary instructions that are dependent on that primary instruction). Instructions output by the instruction decoder for execution are sent to a queue associated with the appropriate instruction pipeline. Prior to sending an instruction from the queue to the instruction pipeline for execution the queue checks, for each secondary instruction, the counter(s) associated with the primary instruction(s) from which the secondary instruction depends. So long as at least one of the counter(s) associated with a primary instruction(s) from which the secondary instruction depends indicates there is a hazard the secondary instruction is stalled in the queue.

Stalling secondary instructions right before they are to be executed by an instruction pipeline has shown to improve performance in cases where the primary instruction(s) on which the secondary instruction depends will be completed quickly (e.g. when a primary instruction is executed by an instruction pipeline with high throughput). Such inter-pipeline data hazards may be referred to herein as low latency inter-pipeline data hazards. However, stalling secondary instructions right before they are to be executed by an instruction pipeline has shown to reduce performance where the primary instruction(s) on which the secondary instruction depends will be completed slowly (e.g. when a primary instruction is executed by an instruction pipeline with low throughput). Such inter-pipeline data hazards may be referred to herein as high latency inter-pipeline data hazards.

Accordingly, in some embodiments described herein the compiler may be configured to separately identify and mark low latency inter-pipeline data hazards and high latency inter-pipeline data hazards. In these embodiments, the low latency inter-pipeline data hazards may be processed as described above (e.g. when an instruction decoder outputs a primary instruction of a low latency inter-pipeline data hazard the value of a counter associated with the primary instruction is adjusted to indicate there is a hazard related to that primary instruction and when it is subsequently detected that the hazard related to that primary instruction has been resolved (e.g. the primary instruction has written data to memory) the value of the counter associated with the primary instruction is adjusted to indicate that the hazard related to that primary instruction has been resolved; and secondary instructions related to a low latency data hazard that have been output by the instruction decoder for execution are stalled in a queue preceding the appropriate instruction pipeline so long as the value of at least one of the counters associated with the primary instructions from which it depends indicate that there is a hazard).

The high latency inter-pipeline data hazards, however, are processed in a different manner. Specifically, the primary instructions of high latency inter-pipeline data hazards are processed in the same manner as the primary instructions of low latency inter-pipeline data hazards (e.g. when a primary instruction of a high latency inter-pipeline data hazard is output by a decoder for execution by an instruction pipeline the value of a counter associated therewith is adjusted to indicate there is a data hazard related to the primary instruction and when it is subsequently detected that the hazard has been resolved (e.g. the primary instruction has written to memory) the value of the counter associated therewith is adjusted to indicate that the data hazard related to the primary instruction has been resolved). However, when secondary instructions of at least one high latency data hazard are decoded by the instruction decoder a determination is made then as to whether the relevant high latency data hazard(s) have been resolved (i.e. whether the values of the counters associated with the primary instruction(s) from which it depends indicate that high latency hazard has been resolved). If the relevant high latency hazards have been resolved, the secondary instruction is output by the decoder for execution by the appropriate instruction pipeline. If, however, at least one relevant high latency hazard has not been resolved, then the instruction decoder de-schedules the secondary instruction (e.g. sends the secondary instruction back to a scheduler) until the relevant high latency hazards have been resolved (i.e. until the counters associated with the primary instructions from which it depends indicate that the hazard has been resolved). Once the relevant high latency hazards for the secondary instruction have been resolved the secondary instruction is rescheduled and sent back to the instruction decoder for processing.

In some cases, a secondary instruction may be dependent on both a high latency primary instruction and a low latency primary instruction. In these cases, the secondary instruction would be subject to both inter-pipeline hazard avoidance mechanisms described above. Specifically, the instruction decoder would check the counters associated with the high latency primary instructions and the queue would be configured to check the counters associated with the low latency primary instructions.

While the methods, systems and techniques described herein are described as being used for inter-pipeline data hazard avoidance, the methods, systems and techniques described herein may also be used for intra-pipeline data hazards. For example, the methods, systems and techniques described herein may be also be used for intra-pipeline data hazard avoidance in cases where the area versus performance trade-off does not justify the cost of having cycle-accurate hazard detection which may be achieved by other methods. In these cases, the compiler would be configured to also identify intra-pipeline data hazards and update the primary and secondary instructions thereof in the same manner as described herein.

Reference is now made to FIG. 1 which illustrates a first example parallel processing unit 100 which may be a GPU or other parallel processing unit. It will be appreciated that FIG. 1 only shows some elements of the parallel processing unit 100 and there may be many other elements (e.g. caches, interfaces, etc.) within the parallel processing unit that are not shown in FIG. 1. The parallel processing unit 100 of FIG. 1 comprises a counter block 102 comprising a plurality of counters 103, an instruction decoder 104, a plurality of instruction pipelines 106, monitor logic 108 and a queue 110 preceding each instruction pipeline 106.

The counter block 102 comprises a plurality of counters 103 that are used to track inter-pipeline data hazards and enforce ordering of the instructions in accordance therewith. In particular, the counters 103 are used to indicate (i) when there is a hazard related to a primary instruction and thus it is not safe for a secondary instruction that is dependent thereon to be executed (e.g. the secondary instruction(s) should stall); and (ii) when the hazard related to a primary instruction has been resolved and thus it is safe for the secondary instruction(s) that are dependent thereon to be executed. Specifically, the counters 103 are configured so that when a counter has predetermined value or set of values it indicates that there is a hazard related to the associated primary instruction; and when a counter has a different predetermined value or set of predetermined values it indicates that the hazard related to the associated primary instruction has been resolved. In some examples, the counters 103 are configured so that when a counter has a non-zero value it indicates that there is a hazard related to the associated primary instruction and when a counter has a zero value it indicates that the hazard related to the associated primary instruction has been resolved. It will be evident to a person of skill in the art that this is an example only and that the counters 103 may be configured so that different values indicate that there is a hazard and/or the hazard has been resolved.

When a counter 103 indicates that there is a hazard related to the associated primary instruction the counter 103 acts as a fence at which a secondary instruction from which it depends has reached. Specifically, the secondary instruction must wait until the fence is removed. Accordingly, the counters 103 of FIG. 1 may be referred to herein as fence counters.

The counter block 102 is configured to adjust the values of the counters 103 in response to receiving adjustment instructions or signals from the instruction decoder 104, monitor logic 108, and optionally the queues 110; and to generate and provide counter status information to the queues 110. In particular, as described in more detail below, the instruction decoder 104 is configured to, in response to outputting a primary instruction for execution (e.g. in response to forwarding a primary instruction to a queue 110) send an adjustment instruction or signal to the counter block 102 that causes the counter block 102 to adjust the value of a counter 103 associated with the primary instruction to indicate there is a hazard with the primary instruction. The monitor logic 108 is configured to, in response to detecting that a hazard related to a primary instruction has been (partially or fully) resolved by an instruction pipeline 106, send an adjustment instruction or signal to the counter block 102 that causes the counter block 102 to adjust the value of the counter 103 associated with the primary instruction to indicate that the hazard related to the primary instruction has been (partially or fully) resolved. The queue 110 may also be configured to, in response to detecting that a primary instruction is (partially or fully) no longer active and thus the primary instruction is (partially or fully) discarded, send an adjustment instruction or signal to the counter block 102 that causes the counter block 102 to adjust the value of the counter 103 associated with the primary instruction to indicate that the hazard related to the primary instruction has been (partially or fully) resolved.

The counter status information comprises information that indicates whether there is a hazard related to the primary instruction associated with each counter or whether the hazard has cleared, or has been resolved. The counter block 102 is configured to generate the counter status information based on the value of the counters 103. In some cases, the counter status information may comprise a flag or bit for each counter 103 indicating whether there is a hazard related to the corresponding primary instruction or whether the hazard related to the corresponding primary instruction has been resolved. For example, the counter status information may comprise a single-bit flag for each counter 103 where a flag is set to "1" to indicate that there is a hazard related to the primary instruction and a flag is set to "0" to indicate that the hazard related to the primary instruction has been resolved. In other cases, the counter status information may comprise the value of each of the counters 103 and the recipient of the counter status information is configured to determine from the values whether the hazards related to the associated primary instructions have been resolved.

The instruction decoder 104 receives instructions which include information (inserted at build time—e.g. by a compiler) that identify primary instructions (i.e. instructions from which at least one other instruction in another instruction pipeline is dependent on), secondary instructions (i.e. instructions that are dependent on at least one primary instruction in another pipeline) and the counter(s) they are associated with. Specifically, each primary instruction will be allocated a counter and the secondary instruction(s) will be linked to the primary instruction via that counter. Since a secondary instruction may be dependent on more than one primary instruction, secondary instructions may be linked to multiple primary instructions via multiple counters. An example of the information and format of the information that identifies primary and secondary instructions and the counters they are associated with is described below with reference to FIG. 2. There are typically fewer counters than there are inter-pipeline data hazards so the counters are generally re-used for multiple inter-pipeline data hazards.

The instruction decoder 104 decodes the received instructions, selects the appropriate instruction pipeline for executing each instruction, and outputs the instructions for execution by the selected instruction pipelines. If the instruction decoder 104 determines that an instruction output for execution is a primary instruction the instruction decoder sends an adjustment instruction or signal to the counter block 102 that causes the counter block 102 to adjust the value of the counter 103 associated with that primary instruction to indicate that there is a hazard related to the primary instruction (and thus it is not safe to execute secondary instructions that are dependent on that primary instruction). For example, if primary instruction X is associated with counter 2 then when the instruction decoder 104 outputs primary instruction X for execution the instruction decoder 104 will output an adjustment signal or instruction to the counter block 102 that causes the counter block 102 to adjust the value of the counter 2 to indicate that there is a hazard related to primary instruction X.

In some examples, the instruction decoder 104 may be configured to, in response to outputting a primary instruction for execution, output an adjustment instruction or signal that causes the counter block 102 to increment the counter 103 associated with the primary instruction by a predetermined amount (e.g. 8). In some cases, as described below, each instruction may be part of, or related to, a task that causes multiple instances of the instruction to be executed. In these cases, it may only be safe for a secondary instruction to be executed if the hazard has been resolved for all instances of the primary instruction. In such cases the predetermined amount by which the counter 103 is incremented may reflect the number of instances, or groups of instances, for which the hazard can be separately tracked. For example, if 32 instances of the instruction may be executed in groups of 4 (i.e. 8 groups) the instruction decoder 104 may be configured to increment the counter 103 by 8.

Each instruction pipeline 106 comprises hardware logic (e.g. one or more ALUs) for executing instructions. In some examples, the plurality of instruction pipelines 106 includes at least two different instruction pipelines that are configured to execute decoded instructions of different types. For example, the instruction pipelines 106 may comprise one or more instruction pipelines that are configured to: (i) perform bit integer operations, floating point operations and logical (bitwise) operations; (ii) calculate per-instance texture coordinate or other varyings; (iii) perform 32-bit float non-rational/transcendental operations; (iv) execute 64-bit float operations; (v) perform data copying and format conversion; (vi) execute texture address calculation; and (vii) execute atomic operations on local memory registers. Having multiple instruction pipelines that are configured to execute different types of instructions allows slow or rarely used instructions to be executed in parallel with high-throughput common arithmetic operations so that the slow or rarely used instructions do not become a bottleneck. This also allows ALUs to be separately optimised for their particular use.

In some cases, the instruction pipelines 106 may each be single-instruction multiple-data (SIMD) pipelines. As is known to those of skill in the art, a SIMD instruction is an instruction that, when executed, causes the same operation(s) to be performed on multiple data items that are associated with the instruction. SIMD instructions allow fewer instructions to specify the same amount of work reducing the pressure on the instruction fetch module and the instruction decoder. A SIMD pipeline is thus a pipeline that is able to process SIMD instructions—i.e. it is a pipeline that is able to execute the same instruction on multiple data items. This means that where the instructions are part of tasks, as described in more detail below, the instruction pipelines 106 can execute an entire task's worth of instances or data-items using one issued instruction. The instruction pipeline may take more than one clock cycle to process the issued SIMD instruction.

The monitor logic 108 monitors the instruction pipelines 106 to detect when a hazard related to a primary instruction has been resolved (partially or fully) by an instruction pipeline and in response to detecting that a hazard related to a primary instruction has been (partially or fully) resolved by an instruction pipeline 106 sends an adjustment instruction or signal to the counter block 102 to cause the counter associated with the primary instruction to indicate that the hazard related to the primary instruction has been (partially or fully) resolved. For example, if a primary instruction is associated with counter 2, when the monitor logic 108 detects that an instruction pipeline 106 has resolved the hazard related to that primary instruction the monitor logic 108 will send an adjustment signal or instruction to the counter block 102 to cause the counter block 102 to adjust the value of the counter 2 to indicate that the hazard associated with that primary instruction has been resolved.

In some examples, the monitor logic 108 may be configured to, in response to detecting that a hazard associated with a primary instruction has been (partially or fully) resolved by an instruction pipeline 106, send an adjustment signal or instruction to the counter block 102 that causes the counter block 102 to decrement the value of the counter 103 by a predetermined amount (e.g. 1 or 8) to indicate that the hazard has been (partially or fully) resolved.

As described in more detail below, in some cases, each instruction may be part of, or associated with, a task which causes multiple instances (e.g. up to 32 instances) of the instruction to be executed. In these cases, the hazard is said to be fully resolved when the hazard has been resolved by all instances, and the hazard is said to be partially resolved when the hazard has been resolved by some (but not all) of the instances. The instances may be divided into a number of groups (e.g. 8) and each group is executed as a block such that the execution of each block can be tracked separately. In these cases, the monitor logic 108 may be configured to send a separate instruction or signal each time it detects that a hazard related to a primary instruction has been resolved by a group of instances to cause the value of the counter to be adjusted to indicate that the hazard has been partially resolved (e.g. an instruction to decrement the value of the counter by 1). Once the hazard is resolved by each group the counter will indicate that the hazard has been fully resolved. It will be evident to a person of skill in the art that this is an example only and that the monitor logic 108 may be configured to cause the counter block 102 to adjust the value of the counter associated with a primary instruction in any suitable manner so that the counter will have a value indicating that the hazard related thereto has been (fully or partially) resolved.

The monitor logic 108 may be configured to use different criteria to determine when a hazard has been resolved by an instruction pipeline 106 based on the type of hazard. For example, a WAW or a RAW hazard may be resolved when the primary instruction has written the result of the instruction to storage 112 such as memory 114 or a register (not shown). Accordingly, the monitor logic 108 may be configured to detect that a WAW or RAW hazard has been resolved by an instruction pipeline 106 when the monitor logic 108 detects that an instruction pipeline 106 has written the result of a primary instruction to storage 112. In these cases, where each instruction pipeline 106 has an interface to the storage units, the monitor logic 106 may be configured to monitor these instruction pipeline 106 to storage interfaces to detect writes to the storage. In contrast, a WAR hazard may be resolved when the sources for the primary instruction have been read by the instruction pipeline 106. Accordingly, the monitor logic 108 may be configured to detect that a WAR hazard has been resolved by an instruction pipeline 106 when the monitor logic 108 detects that the sources for a primary instruction have been read by an instruction pipeline 106.

Although the monitor logic 108 is shown in FIG. 1 as being a single logic block that is separate from the instruction pipelines, in other examples the monitor logic 108 may be distributed amongst, and part of, the instruction pipelines 106. For example, each instruction pipeline 106 may comprise its own monitor logic.

Each instruction pipeline 106 is preceded by a queue 110 that receives instructions from the instruction decoder 104 that are to be executed by the corresponding instruction pipeline 106 and forwards the received instructions to the corresponding instruction pipeline 106 for execution in order. Each queue 110 is configured to, prior to forwarding an instruction to the corresponding instruction pipeline 106 for execution, determine whether the instruction is a secondary instruction. If the instruction is not a secondary instruction then the instruction is forwarded to the corresponding instruction pipeline 106 for execution. If, however, the instruction is a secondary instruction then a determination is made (from the counters 103 and/or the counter status information) whether the hazards related to the primary instructions from which the secondary instruction depends have been resolved. If the hazards related to the primary instruction from which the secondary instruction depends have been resolved then the secondary instruction is forwarded to the corresponding instruction pipeline 106 for execution. If, however, at least one of the hazards related to a primary instruction from which the secondary instruction depends have not been resolved then the instruction is stalled.

Accordingly, only if all the counters associated with the primary instruction(s) indicate that the related hazard has been resolved can an instruction be forwarded to the instruction pipeline 106 for execution. For example, if a queue 110 receives a secondary instruction that is dependent on the primary instructions associated with counters 2 and 3 then the queue 110 cannot forward the secondary instruction to the instruction pipeline until counters 2 and 3 both have a value (e.g. zero) indicating that the related hazards have been resolved.

In some examples, stalling a secondary instruction may stall all subsequent instructions from being executed by the associated instruction pipeline. However, as described in more detail below with reference to FIG. 3, in other examples, where the instructions are part of, or associated with tasks, while a queue 110 stalls a secondary instruction related to a first task it may be able to forward other later instructions related to a different task to the associated instruction pipeline.

In some cases, the queue 110 may be configured to determine the value of the appropriate counter(s) by polling or requesting counter status information for the appropriate counters from the counter block 102. In other cases, the counter block 102 may be configured to periodically push the counter status information to the queues 110.

In some cases, the queue 110 may also be configured send an adjustment instruction or signal to the counter block 102 that causes the counter block 102 to adjust the value of the counter 103 associated with the primary instruction to indicate that the hazard has been (partially or fully) resolved if the queue 110 detects, prior to forwarding, that the instruction is to be (partially or fully) discarded. Specifically, for a variety of reasons it may be possible for an instruction to be sent to the queue 110 for execution, but when it is time for that instruction to be issued to the instruction pipeline it may no longer be desirable for that instruction to be executed.

For example, this may occur when the parallel processing unit implements predication. As is known to those of skill in the art, predication is a process implemented in parallel processing units that is an alternative to branch prediction. In branch prediction the parallel processing unit predicts the path of a branch that will be executed and predictively executes the instructions related to that branch. A misprediction (i.e. an incorrect guess of which path of the branch will be taken) can result in a stall of a pipeline and cause instructions to be fetched from the actual branch target address. In contrast, in predication instructions related to all possible paths of a branch are executed in parallel and only those instructions associated with the taken path (as determined from the branch condition) are permitted to modify the architecture state. Each instruction from a particular path will be associated with a predicate (e.g. Boolean value) which indicates whether the instruction is allowed to modify the architecture state or not. The predicate value will be set based on the evaluation of the branch condition. An instruction whose predicate indicates that the instruction is not allowed to modify the architecture state is said to have been predicated out. If an instruction has been predicated out before it is forwarded to an instruction pipeline then there is no need to forward it to the instruction pipeline for execution.

Accordingly, before an instruction is forwarded to the instruction pipeline for execution the queue 110 may be configured to determine based on active information (e.g. predicate information) whether it is desirable to forward the instruction to the pipeline for execution. If the active information indicates that the instruction is not to be executed (e.g. the predicate indicates the instruction has been predicated out) then the instruction is discarded, and, if the instruction is a secondary instruction, the queue 110 sends an adjustment instruction or signal to the counter block 102 that causes the counter block 102 to adjust the value of the counter 103 associated with that primary instruction to indicate that the hazard has been resolved (e.g. an instruction that causes the counter block to decrement the value of the counter by a predetermined amount).

Where the instructions are associated with tasks then it is possible for the instruction to be active for some instances and not others. This may occur for example, where the instructions are predicated on a per instance basis. In these cases, the queue 110 may be configured to detect if the instruction is partially active (some but not all instances are active), fully inactive (all instance are inactive), or fully active (all instances are active). If the queue 110 detects that the instruction is fully inactive the queue 110 may send an adjustment instruction to the counter block 102 that causes the counter block 102 to adjust the value of the counter 103 associated with that primary instruction to indicate that the hazard has been fully resolved (e.g. an instruction that causes the counter block to decrement the value of the counter by 8), and if the queue 110 detects that the instruction is partially inactive the queue 110 may send an adjustment instruction to the counter block 102 that causes the counter block 102 to adjust the value of the counter 103 associated with the primary instruction to indicate that the hazard has been partially resolved (e.g. an instruction that causes the counter block to decrement the value of the counter by less than 8 to reflect what portion of the instruction the hazard has been resolved).

An example implementation of the queue 110 of FIG. 1 is described below with reference to FIG. 3.

In some examples, the instructions decoded by the instruction decoder 104 and executed by the instruction pipelines 106 each relate to or correspond to a task. The term 'task' is used herein to refer to a group or body of work (i.e. a plurality of work-items or program instances) in which the same program (e.g. the same sequence of ALU instructions) is applied to a set of data, where this data may comprise one or more elements (or data-items, e.g. a plurality of pixels or vertices). A task therefore refers to one or more data-items (one or more references/points to data-items) and a program (or reference (e.g. pointer) to a program (i.e. a sequence of instructions)) which are to be executed on the data-items. As described above, when an instruction related to a task is executed an instance of that instruction is independently executed against each of the data items.

In these examples, tasks may be received at a scheduler 116 which schedules the received tasks for execution (i.e. determines the order in which the tasks are to be executed). Once the scheduler 116 determines which task is to be executed next, the scheduler 116 sends information identifying that task (e.g. a task ID) and information identifying the next instruction to be fetched (e.g. program counter value) to an instruction fetch module 120. The instruction fetch module 120 then fetches the next instruction for that task from memory (e.g. via a cache structure) based on the received information (e.g. the program counter value). The fetched instruction is then sent to the instruction decoder 104 to be decoded. A task that has been sent to the instruction fetch module 120 for execution is said to be an active task or a scheduled task. The instruction fetch module 120 and the instruction decoder 104 may form part of an instruction controller 118.

Since tasks contain related instructions (e.g. instructions of the same program) there are typically dependencies (e.g. hazards) between instructions within a task, but there are not typically dependencies (e.g. hazards) between instructions in different tasks. As a result, there may be a plurality of counters 103 associated with each task ID to track the inter-pipelines hazards within a task via that task ID. An example of a counter block 102 wherein the counters 103 are associated with one of the task IDs is described below in relation to FIG. 4. Where the counters associated with each task ID are assigned the same counter IDs (e.g. counter numbers) the specific counter associated with an instruction may be identified or indexed using both the task ID and the counter ID.

Figure 2:
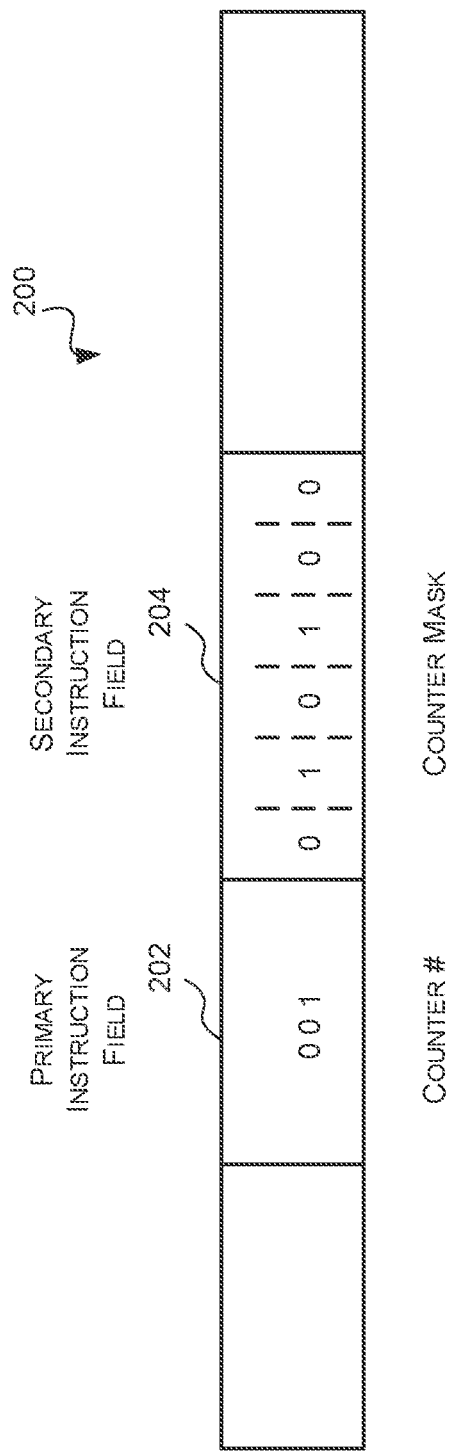
FIG. 2 is a schematic diagram of the format of an instruction of FIG. 1.

Reference is now made to FIG. 2 which illustrates an example format of an instruction 200 in the system of FIG. 1 that comprises information identifying primary instructions and secondary instructions and the counters they are associated with. In the example of FIG. 2 the instruction comprises a primary instruction field 202 and a secondary instruction field 204. The primary instruction field 202 indicates whether or not the instruction is a primary instruction and if so what counter the primary instruction is associated with. In particular, in the example of FIG. 2 the primary instruction field 202 is configured to hold an N-bit number. When the N-bit number has a particular value (e.g. zero) it indicates that the instruction is not a primary instruction, and when the N-bit number has a value other than the particular value (e.g. a non-zero value) it indicates that the instruction is a primary instruction and it identifies the counter that the primary instruction is associated with (e.g. by number).

For example, a three-bit primary instruction field 202 with a binary value of "000" (i.e. a decimal value of zero) may indicate that the instruction is not a primary instruction (i.e. no other instructions in another instruction pipeline are dependent on this instruction) and a three-bit primary instruction field 202 with a binary value of "001" (i.e. a decimal value of one) may indicate that the instruction is a primary instruction (i.e. there is at least one other instruction in another instruction pipeline that is dependent on this instruction) and that the primary instruction is associated with counter number 1.

The number of bits (i.e. N) allocated to the primary instruction field 202 will be based on the number of counters 103. Specifically, the primary instruction field 202 generally comprises enough bits to uniquely identify each of the counters. For example, if there are six counters then the primary instruction field may comprise 3 bits (which can represent 8 unique numbers) to be able to uniquely identify the six counters by a unique number.

The secondary instruction field 204 indicates whether the instruction is a secondary instruction and if so, which counters are associated with the primary instructions it is dependent on. In the example of FIG. 2 the secondary instruction field 204 is configured to hold an M-bit mask. There is one bit per counter and the value of that bit indicates whether the instruction is dependent on the primary instruction associated with that counter. For example, if there are six counters there will be six bits in the mask, the first bit may correspond to the first counter, the second bit may correspond to the second counter, the third bit may correspond to the third counter etc. In some cases, a bit that is set (e.g. is "1") may indicate that the instruction is dependent on the primary instruction associated with the corresponding counter, and a bit that is cleared, or is not set, (e.g. is "0") may indicate that the instruction is not dependent on the primary instruction associated with the corresponding counter. In these cases, if at least one of the bits in the mask of the secondary instruction field 204 is set then the instruction is dependent on at least one instruction in another pipeline and thus the instruction is a secondary instruction; and if none of the bits in the mask of the secondary instruction field 204 are set then the instruction is not dependent on any instructions in another pipeline and thus the instruction is not a secondary instruction.

For example, a 6-bit secondary instruction field 204 with a binary value of "000000" may indicate that that the instruction is not a secondary instruction (i.e. it is not dependent on any other instructions) and a 6-bit secondary instruction field 204 with a binary value of "010100" may indicate that the instruction is a secondary instruction that is dependent on the instructions associated with the second and fourth counters.

Since an instruction can be both dependent on one or more other instructions and have one or more other instructions depend on it, it is possible for an instruction to be both a primary instruction and a secondary instruction.

As described above, the instructions, such as instructions 200 of FIG. 2, may be generated at build time by a compiler that is configured to identify inter-pipeline data hazards and allocate a counter to each identified inter-pipeline data hazard to be used to track the inter-pipeline data hazard and enforce the appropriate order. The primary instruction of that data hazard is then modified to include information (e.g. in the primary instruction field 202) that indicates that it is a primary instruction and the counter that has been associated with that primary instruction; and the secondary instruction(s) of the data hazard are modified to include information (e.g. in the secondary instruction field 204) that indicates the counters associated with the primary instructions that it is dependent on.

In some cases, the compiler may be configured to allocate one counter to each identified inter-pipeline data hazard. In other cases, the compiler may be configured to use a single counter for multiple identified inter-pipeline data hazards. For example, if instructions C and D are to be executed in the same instruction pipeline and C is dependent on instruction A and instruction D is dependent on instruction B then primary instructions A and B may both be allocated the same counter. C will then have to wait for the hazard associated with instructions A and B to be resolved before it can be executed and since D follows C will also have to wait for the hazard associated with instruction A and B to be resolved. If instructions C and D are to be executed in different instruction pipelines then they will both wait for the hazards associated with instruction A and B to be resolved, but they may have waited too long. Using a single counter for multiple inter-pipeline data hazards are preferred where a secondary instruction is dependent on two different primary instructions in different pipelines. In such cases the primary instructions could both be allocated the same counter. Accordingly, in some cases there may be a performance cost in using a single counter for multiple inter-pipeline data hazards, however this may allow a smaller number of counters to be used thereby decreasing the size of the hardware implementation.

Figure 3:
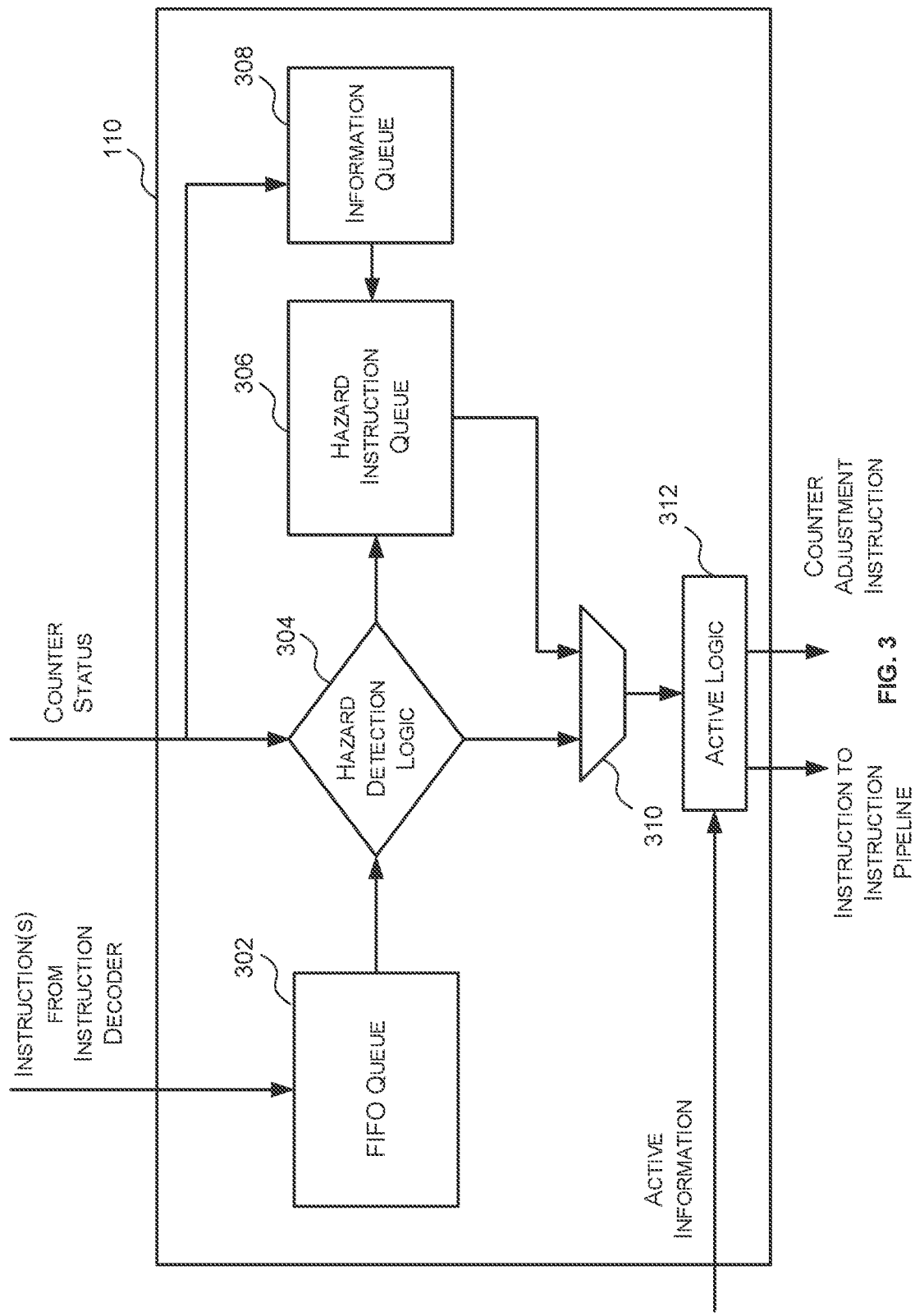
FIG. 3 is a block diagram of an example queue of FIG. 1.

Reference is now made to FIG. 3 which illustrates an example implementation of a queue 110 of FIG. 1 for use in a parallel processing unit wherein each instruction corresponds to a task that has been allocated a task ID and each instruction pipeline 106 receives instructions relating to multiple tasks each with a corresponding different task ID. As described above, the queue 110 receives instructions from the instruction decoder 104 to be executed by the corresponding instruction pipeline 106 and forwards the instructions to the corresponding instruction pipeline 106 in the correct order. However, any secondary instruction cannot be forwarded to the instruction pipeline 106 until the counters associated with the primary instructions from which the secondary instruction depends indicate the hazards related to the primary instructions have been resolved. In this example, the queue 110 preferably issues all instructions to the corresponding instruction pipeline in the order in which they were received, but the queue 110 must maintain the order of the instructions within a task. This means that if a secondary instruction is stalled because the counters associated with the primary instruction(s) from which the secondary instruction depends do not indicate that the hazard has been resolved then only the subsequent instructions related to the same task (e.g. identified by the same task ID) also need to be stalled and subsequent instructions related to a different task (e.g. identified by a different task ID) may be forwarded to the corresponding instruction pipeline 106 before the stalled secondary instruction.

In the example of FIG. 3 the queue 110 comprises a FIFO (first in first out) queue 302, hazard detection logic 304, a hazard instruction queue 306, an information queue 308 and a MUX (multiplexer) 310.

The FIFO queue 302 receives instructions output by the instruction decoder 104, stores the instructions in the order they were received, and then outputs them to the hazard detection logic 304 in the same order (i.e. the order in which they were received). In some cases (e.g. when there is one instruction decoder), the FIFO queue 302 may be capable of receiving a maximum of one instruction per clock cycle. In other cases (e.g. when there are multiple instruction decoders), the FIFO queue 302 may be capable of receiving more than one instruction per clock cycle. The FIFO queue 302 can typically only output a maximum of one instruction per clock cycle.

The hazard detection logic 304 is configured to determine whether the instruction output from the FIFO queue 302 is hazard free or not (i.e. whether the instruction can be safely executed). In this example, there are two potential hazards: (i) the instruction may be a secondary instruction that is waiting for the hazard(s) related to one or more primary instructions to be resolved before it can be issued to the instruction pipeline for execution; and/or (ii) the instruction may relate to the same task (e.g. has the same task-ID) as an instruction in the hazard instruction queue 306 and thus has to wait for that instruction to be issued to the corresponding instruction pipeline before it can be issued to the instruction pipeline for execution. Since a younger instruction related to a task cannot be issued to the instruction pipeline before an older instruction related to the same task, if there is already an instruction in the hazard instruction queue 306 related to the same task that has not been issued to the instruction pipeline then the new instruction must wait for the older instruction to be issued to the instruction pipeline before it can be issued to the instruction pipeline.

In some cases, the hazard detection logic 304 is configured to first determine whether there are any instructions in the hazard instruction queue 306 that are related to the same task (e.g. based on the task ID associated with the instruction). If it is determined that there is at least one stalled instruction in the hazard instruction queue 306 with the same task ID then the instruction cannot be safely executed and the instruction is sent to the hazard instruction queue 306 where it waits for the earlier instruction with the same task ID to be sent to the corresponding instruction pipeline 106.

If, however, there are no instructions in the hazard instruction queue 306 that have the same task ID then it is determined whether the instruction received from the FIFO queue 302 is a secondary instruction (indicating a potential hazard). If the hazard detection logic 304 determines that the instruction received from the FIFO queue 302 is not a secondary instruction then the instruction is a hazard free instruction (and thus is ready to be executed) and the instruction is forwarded directly to the MUX 310. If, however, the hazard detection logic 304 determines that the instruction received from the FIFO queue 302 is a secondary instruction (e.g. the secondary instruction field of the instruction is non-zero) then the hazard detection logic 304 determines whether the counters associated with the primary instructions from which it depends indicate that the hazard related to the associated primary instruction has been resolved (e.g. via the counter status information).

If all relevant counters indicate that the hazard related to the associated primary instructions have been resolved (e.g. all the relevant counters are zero) then the instruction is a hazard free instruction (and thus is ready for execution) and the instruction is forwarded directly to the MUX 310. If, however, at least one of the relevant counters indicates that the hazard related to the associated primary instruction has not been resolved (e.g. at least one of the relevant counters has a non-zero value) then the instruction is a hazard instruction and is forwarded to the hazard instruction queue 306.

The hazard instruction queue 306 is configured to store hazard instructions in order until the corresponding hazard(s) have cleared. The information queue 308 stores information for each hazard instruction in the hazard instruction queue 306 indicating the hazard(s) associated with that instruction. For example, the information queue 308 may store, for each hazard instruction, information indicating whether the hazards related to each primary instruction from which it depends have been resolved and/or information indicating whether the instruction is waiting for another instruction in the hazard queue and if so, which one.

As described above, in this example there are two potential hazards: (i) the instruction may be a secondary instruction that is waiting on the hazard related to one or more primary instructions to be resolved; and/or (ii) the instruction may relate to the same task-ID as an instruction in the hazard instruction queue 306 and is waiting for that instruction to be issued to the corresponding instruction pipeline. Accordingly, the information queue 308 may store a single bit or flag indicating whether the corresponding hazard instruction is waiting for a hazard related to a primary instruction to be resolved (which may be set if at least one of the counters associated with a primary instruction from which the instruction depends indicates that the hazard has not been resolved and may be cleared once all of the counters associated with the primary instruction from which the instruction depends indicates that the hazards have been resolved); and/or the information queue 308 may store a flag or bit indicating whether or not the instruction is waiting for another instruction in the hazard instruction queue 306 to be issued to the corresponding instruction pipeline.

When the information in the information queue 308 indicates that all hazards have cleared (e.g. the counter values for the relevant counters indicate that the hazard related to the primary instructions from which it depends have been resolved and/or the hazard instruction that it is waiting for has been forwarded to the corresponding instruction pipeline) for a particular instruction then the hazard instruction queue 306 forwards the cleared hazard instruction to the MUX 310.

When the corresponding instruction pipeline 106 is ready to receive the next instruction the MUX 310 is configured to select one of: the instruction output by the hazard detection logic 304; and the instruction output by the hazard instruction queue 306, to forward to the corresponding instruction pipeline 106 for execution. If only one of the hazard detection logic 304 and the hazard instruction queue 306 has output an instruction in the same clock cycle then that MUX 310 selects and forwards that instruction to the corresponding instruction pipeline. If, however, both the hazard detection logic 304 and the hazard instruction queue 306 output an instruction in the same clock cycle then the MUX 310 selects the instruction output from the hazard instruction queue 306 as typically this instruction is older than the instruction output by the hazard detection logic 304.

In some cases, the queue 110 may also comprise active logic 312 configured to receive the instruction output by the MUX 310 and receive active information that indicates whether all or part of the instruction is active. As described above, it may be possible for an instruction to be sent to the queue for execution, but when it is time for that instruction to be issued to the instruction pipeline it may no longer be desirable for that instruction to be executed (e.g. it may have been predicated out). Accordingly, before the instruction output by the MUX 310 is forwarded to the instruction pipeline for execution the active logic 312 is configured to determine whether it is desirable to forward the instruction to the pipeline for execution based on active information. If the active information indicates that the instruction is not to be executed then the instruction is discarded, and if the instruction is a primary instruction the active logic 312 sends an instruction to the counter block 102 that causes the counter block 102 to adjust the value of the counter 103 associated with that primary instruction to indicate that the hazard has cleared (e.g. an instruction that causes the counter block to decrement the value of the counter by a predetermined amount).

Where the instructions are associated with tasks then it is possible for the instruction to be active for some instances and not others. Where the instances are divided into groups which can be individually tracked the active logic 312 may be configured to determine which groups of instances are active (i.e. have at least one active instance). If there are no active groups for an instruction then the instruction is fully inactive and the instruction is discarded. If the fully inactive instruction is a primary instruction the active logic 312 sends an instruction to the counter block 102 that causes the counter block 102 to adjust the value of the counter 103 associated with that primary instruction to indicate that the hazard has been resolved (e.g. an instruction that causes the counter block to decrement the value of the counter by a predetermined amount) since the hazard will not be resolved or cleared by the instruction pipeline 106.

If, however, there is at least one active group for the instruction then the instruction is partially inactive (or partially active) and the active logic 312 forwards the instruction to the instruction pipeline 106 for execution. If the partially inactive instruction is a primary instruction the active logic 312 sends an instruction to the counter block 102 that causes the counter block 102 to adjust the value of the counter to indicate that the hazard has been partially resolved (e.g. an instruction that cause the counter block to decrement the value of the counter by the number of inactive groups) since the instances for the inactive group(s) will not be executed and thus the hazard will not be resolved or cleared by the instruction pipeline 106 for these groups.

Figure 4:
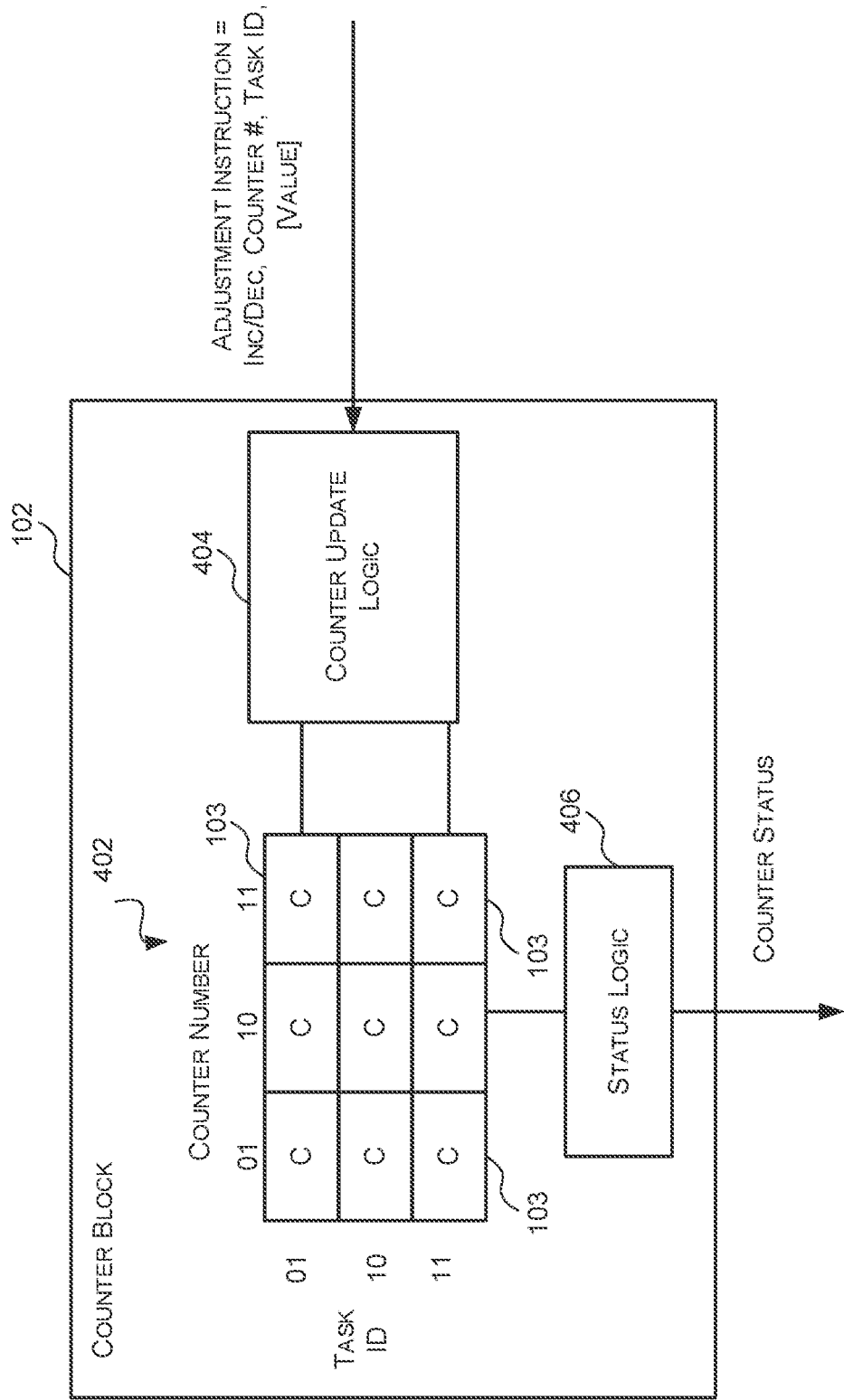
FIG. 4 is a block diagram of an example counter block of FIG. 1.

Reference is now made to FIG. 4 which illustrates an example implementation of the counter block 102 of FIG. 1 wherein each task ID is associated with a plurality of counters 103. The counter block 102 of FIG. 4 comprises a matrix 402 of counters 103, counter update logic 404, and status logic 406.

As described above, instructions that are associated with or form part of a task are related instructions and thus it is possible that inter-pipeline data hazards may occur between instructions within a task. However, since tasks themselves are generally independent of other tasks inter-pipeline data hazards will likely not occur between instructions of different tasks. Accordingly, inter-pipeline data hazards can typically be identified and tracked on a per task basis.

The matrix 402 of counters 103 comprises a row for each possible task ID. For example, where there are 3 possible task IDs the matrix 402 will have three rows as shown in FIG. 4. Each row comprises K counters associated with the corresponding task ID where K is an integer greater than or equal to 2. Accordingly, the counters 103 in a particular row are used to track inter-pipeline data hazards for tasks with the corresponding task ID. For example, in FIG. 4 the counters in the first row of the matrix 402 are used to track inter-pipeline data hazards for tasks with a task ID of "01" (binary) and the second row of the matrix 402 are used to track inter-pipeline data hazards for tasks with a task ID of "10" (binary).

As described above, at build time the inter-pipeline data hazards in a task are identified and the primary instructions are amended to include information identifying the instruction as a primary instruction and information identifying the counter to be used to track the hazard (e.g. counter number); and the secondary instructions are amended to include information identifying the instruction as a secondary instruction and information identifying the counter(s) that is/are used to track the primary instruction(s) from which it depends. Accordingly, in addition to identifying inter-pipeline data hazards in a task and identifying the primary and secondary instructions thereof, the compiler is configured to allocate a counter to each identified inter-pipeline data hazard which is used to track the corresponding data hazard. The compiler may be configured to allocate the counters (e.g. counter numbers) to identified inter-pipeline data hazards in any suitable manner. Where there are a small number of counters available per task so that a counter is likely be used more than once for the same task the compiler may be configured to allocate the counters to the identified inter-pipeline data hazards in a manner that maximizes the time between uses of that counter (e.g. the compiler may be configured to allocate the counters to identified inter-pipeline data hazards on a round-robin basis).

The counter update logic 404 receives adjustment instructions or signals from the instruction decoder 104, the monitor logic 108 and, optionally the queues 110, which cause the value of a counter to be adjusted to reflect the current status of the corresponding inter-pipeline data hazard. In particular, as described above, when the instruction decoder outputs a primary instruction for execution the instruction decoder 104 sends an adjustment instruction to the counter block 102 to cause the counter 103 associated with the primary instruction to have a value that indicates that there is a hazard related to that primary instruction. In some examples, the instruction decoder 104 is configured to transmit an adjustment instruction to the counter block 102 that causes the value of the counter 103 associated with the primary instruction to be incremented by a predetermined amount (e.g. 8).

When the monitor logic 108 subsequently detects that a hazard related to a primary instruction has been (fully or partially) resolved by one of the instruction pipelines (e.g. by monitoring the interfaces between the instruction pipelines and the storage modules) the monitor logic 108 sends an adjustment instruction or signal to the counter block 102 that causes the counter 103 associated with the primary instruction to indicate that the hazard related to the primary instruction has been (partially or fully) resolved. In some examples, the monitor logic 108 is configured to transmit an adjustment instruction to the counter block 102 that causes the value of the counter 103 associated with the primary instruction to be decremented by a predetermined amount (e.g. 8).

If the queue 110 detects that a primary instruction to be forwarded to the corresponding pipeline is (fully or partially) inactive the queue 110 sends an adjustment instruction or signal to the counter block 102 that causes the counter block 102 to adjust the value of the counter 103 associated with the primary instruction to be adjusted to indicate that the hazard related to the primary instruction has been (partially or fully) resolved.

Each adjustment instruction or signal may comprise, but is not limited to, an indication of whether the instruction is an increment instruction or a decrement instruction, the counter number, the task ID and, optionally the value of the increment or decrement. In some cases, some counters 103 may only be incremented or decremented by a fixed amount thus the value of the increment or decrement need not be explicitly provided. The counter update logic 404 uses the counter number and the task ID to identify a particular counter 103 in the matrix 402. The counter update logic 404 then increments or decrements the value of the identified counter 103 based on the adjustment instructions (e.g. it increments or decrements the value of the counter by a specified or predetermined amount).

Although the counter update logic 404 is shown as a single block that performs increments and decrements of the counters 103 in the matrix 402, in other examples there may be separate increment and decrement logic blocks which receive and process increment and decrement instructions respectively. In these cases, the adjustment instructions may not specify whether the adjustment is an increment or a decrement since this can be automatically determined based on which logic block receives the adjustment instruction.

The status logic 406 is configured to generate counter status information indicating the status of the counters 103 in the matrix 402 and provide the counter status information to at least the queues 110. This allows the queues 110 to determine whether to stall a secondary instruction because one or more of the hazards related to a primary instruction from which it depends has not been resolved, or whether all hazards related to primary instructions from which it depends have been resolved and it is safe to forward, or issue, the secondary instruction to the instruction pipeline for execution (assuming there are no other hazards). Specifically, a secondary instruction can only be forwarded to, or issued to, an instruction pipeline 106 if the counters associated with the primary instruction(s) from which it depends indicate that the hazards related to the primary instructions from which it depends have been resolved.

In some cases, the counter status information may comprise for example, a bit or flag for each counter that indicates, based on the value of the counter, whether there is a hazard related to the associated primary instruction or whether the hazard related to the associated primary instruction has been resolved. For example, a flag value "1" may indicate that there is a hazard related to the primary instruction and a flag value of "0" may indicate that the hazard related to the associated primary instruction has been resolved. The flag values may be generated based on the values of the counters 103. For example, as described above, the counters 103 may be configured so that when they have one of one or more predetermined values (e.g. a non-zero value) they indicate that there is a hazard related to the associated primary instruction, and when they have one of one or more other predetermined values (e.g. a zero value) they indicate that the hazard related to the associated primary instruction has been resolved. In other cases, the counter status information may comprise the actual values of the counters 103 in the matrix 402 and the receiver of the counter status information (e.g. the queues 110) is configured to determine from the counter values whether there is a hazard related to the associated primary instruction.

In some cases, the status logic 406 may be configured to periodically push the counter status information to the queues 110. In other cases, the queues 110 may be configured to request the counter status information and the status logic 406 may be configured to provide the counter status information in response to such a request.

Figure 5:
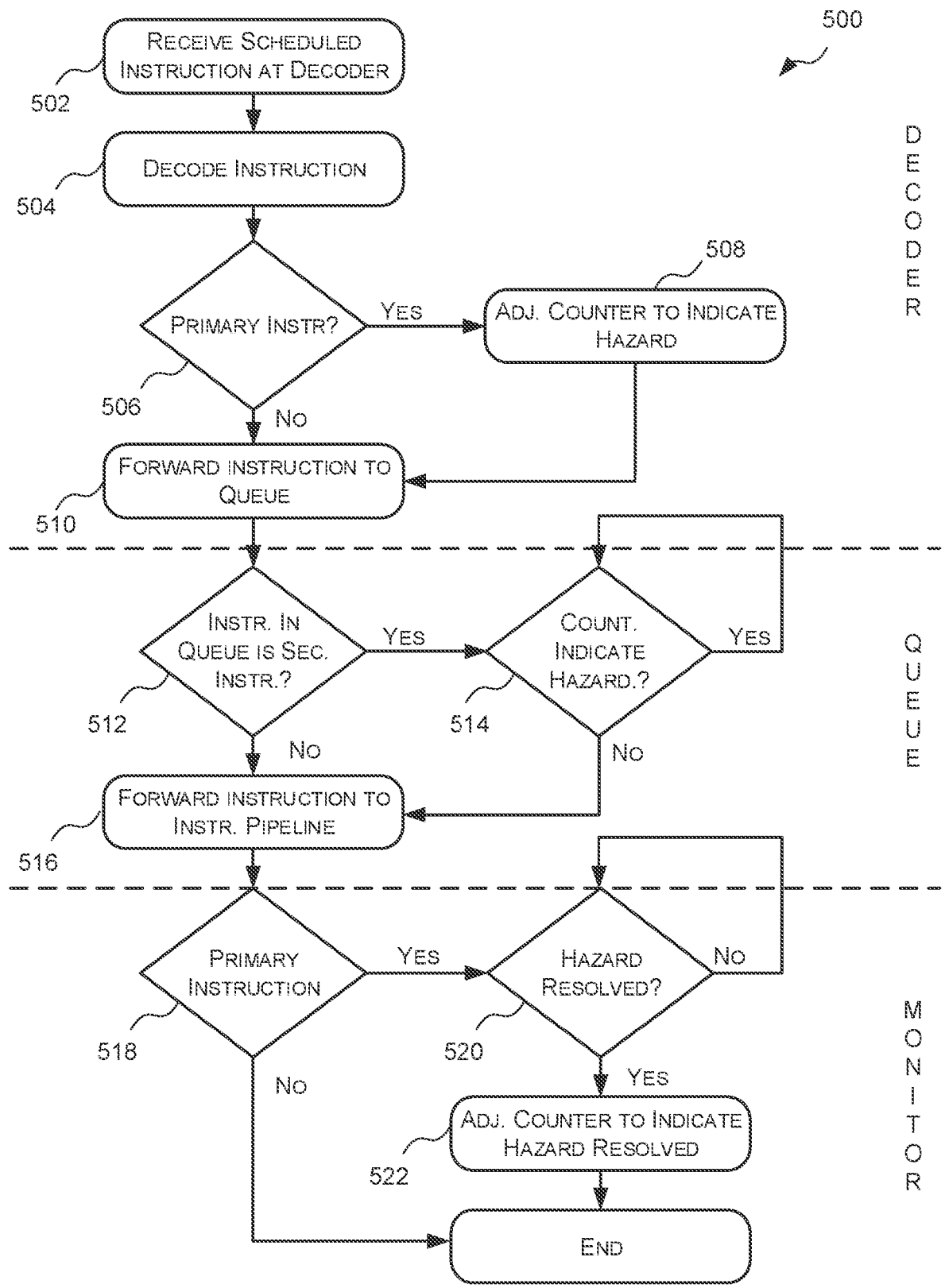
FIG. 5 is a flow diagram of an example method for avoiding inter-pipeline data hazards.

Reference is now made to FIG. 5 which illustrates an example method 500 for avoiding inter-pipeline data hazards in a parallel processing unit such as the parallel processing unit of FIG. 1. The method 500 begins at block 502 where the instruction decoder 104 receives a scheduled instruction to be decoded and at block 504 the instruction decoder 104 decodes the received instruction. If the instruction decoder 104 determines (at block 506) that that decoded instruction is a primary instruction (e.g. from the primary instruction field) then the method 500 proceeds to block 508 where the instruction decoder 104 sends or transmits an adjustment instruction to the counter block 102 which causes the value of the counter 103 associated with the detected primary instruction to be adjusted to have a value (e.g. a non-zero value) that indicates that there is a hazard related to the primary instruction. For example, the instruction decoder 104 may be configured to send or transmit an adjustment instruction to the counter block 102 that causes the value of the counter 103 associated with the detected primary instruction to be incremented by a predetermined amount (e.g. 8). The method 500 then proceeds to block 510.

If the instruction decoder 104 determines at block 506 that the decoded instruction is not a primary instruction (e.g. from the primary instruction field) then the method 500 proceeds to block 510 where the instruction is forwarded to the queue 110 associated with the appropriate instruction pipeline 106. Then at block 512 the queue 110 determines whether the received instruction is a secondary instruction. If the queue 110 determines (at block 512) that the received instruction is a secondary instruction then the method 500 proceeds to block 514 where the instruction is stalled if at least one of the counter(s) associated with the primary instruction(s) from which the secondary instruction depends (e.g. as determined from the secondary instruction field) indicate that there is a hazard related to the primary instruction. Once the counter(s) associated with the primary instruction(s) from which the secondary instruction depends indicate that the hazard related to the primary instruction has been resolved the method 500 proceeds to block 516.

If the queue 110 determines (at block 512) that the received instruction is not a secondary instruction then the method 500 proceeds directly to block 516 where the instruction is forwarded to the corresponding instruction pipeline for execution. The method 500 then proceeds to block 518

At block 518 the monitor logic determines whether the instruction in the instruction pipeline is a primary instruction. If the monitor logic detects (at block 518) that the instruction in the instruction pipeline is a primary instruction then the method 500 proceeds to block 520 where the monitor logic determines whether the instruction pipeline has resolved the hazard related to the primary instruction. If the monitor logic 108 determines that the instruction pipeline has resolved the hazard related to a primary instruction the monitor logic 108 sends (at block 522) an adjustment signal or instruction to the counter block that causes the value of the counter associated with the primary instruction to be adjusted to have a value (e.g. zero) that indicates that hazard related to the primary instruction has been resolved.

Where the number of counters per task ID is small compared to the number of inter-pipeline data hazards per task the counters may be frequently reused within a task. This may result in situations where two primary instructions associated with the same counter are received at the instruction decoder in relatively quick succession so that the instruction decoder may, when it forwards the second primary instruction for execution adjust the value of the common counter to indicate that the second primary instruction has a hazard before all of the secondary instructions related to the first primary instruction have had a chance to read the counter to see that the hazard related to the first primary instruction has been resolved. For example, if first and second primary instructions are associated with counter 1 and there are three secondary instructions that are dependent on the first primary instruction, it may be possible for the value of counter 1 to be adjusted to indicate that there is a hazard related to the first primary instruction in response to the instruction decoder forwarding the first primary instruction for execution, subsequently adjusted to indicate that the hazard related to the first primary instruction has been resolved in response to detecting the instruction pipeline has resolved the hazard, and subsequently adjusted to indicate that there is a hazard related to the second primary instruction in response to the instruction decoder forwarding the second primary instruction for execution, all before the queues of the three secondary instructions have read or obtained the status of counter 1. This would result in the secondary instructions having to wait for the second primary instruction to be completed. Having an instruction waiting on the effects of an instruction that occurs later in the code is clearly problematic as it could result in a deadlock.

Accordingly, in some embodiments, to ensure that a counter 103 is not adjusted to reflect the status of a hazard related to a subsequent primary instruction until there are no secondary instructions waiting on the result of the hazard related to a previous primary instruction, the counter block 102 further comprises a wait counter for each counter 103 that keeps track of the number of secondary instructions waiting on the results of the corresponding counter 103. The value of the wait counter for a counter 103 may be adjusted (e.g. incremented) by the instruction decoder each time a secondary instruction that is dependent on a primary instruction associated with that counter is sent to a queue for execution to indicate that there is one additional secondary instruction waiting on the results of the counter 103. When a secondary instruction that is dependent on a primary instruction associated with a counter 103 is sent from a queue to the corresponding instruction pipeline 106 for execution, or when a secondary instruction that is dependent on primary instruction associated with a counter 103 is discarded by a queue (e.g. in response to the queue determining the instruction is not active), the value of the wait counter for that counter may be adjusted (e.g. decremented) by the queue to indicate that there is one less secondary instruction waiting on the results of the counter 103.

When a primary instruction is received at the instruction decoder the instruction decoder determines if the wait counter for the corresponding counter 103 indicates that there are no secondary instructions waiting on the results of this counter. If the wait counter indicates that there are no secondary instructions waiting on the results of this counter then the instruction is forwarded to the appropriate queue for execution. If, however, the wait counter indicates that there is at least one secondary instruction waiting on the results of this counter then the instruction decoder causes that instruction and related instructions (e.g. instructions in the same task having the same task ID) to be de-scheduled (e.g. the instruction is sent back to a scheduler) where it waits until the wait counter indicates that there are no secondary instructions waiting on the results of the relevant counter.

Figure 6:
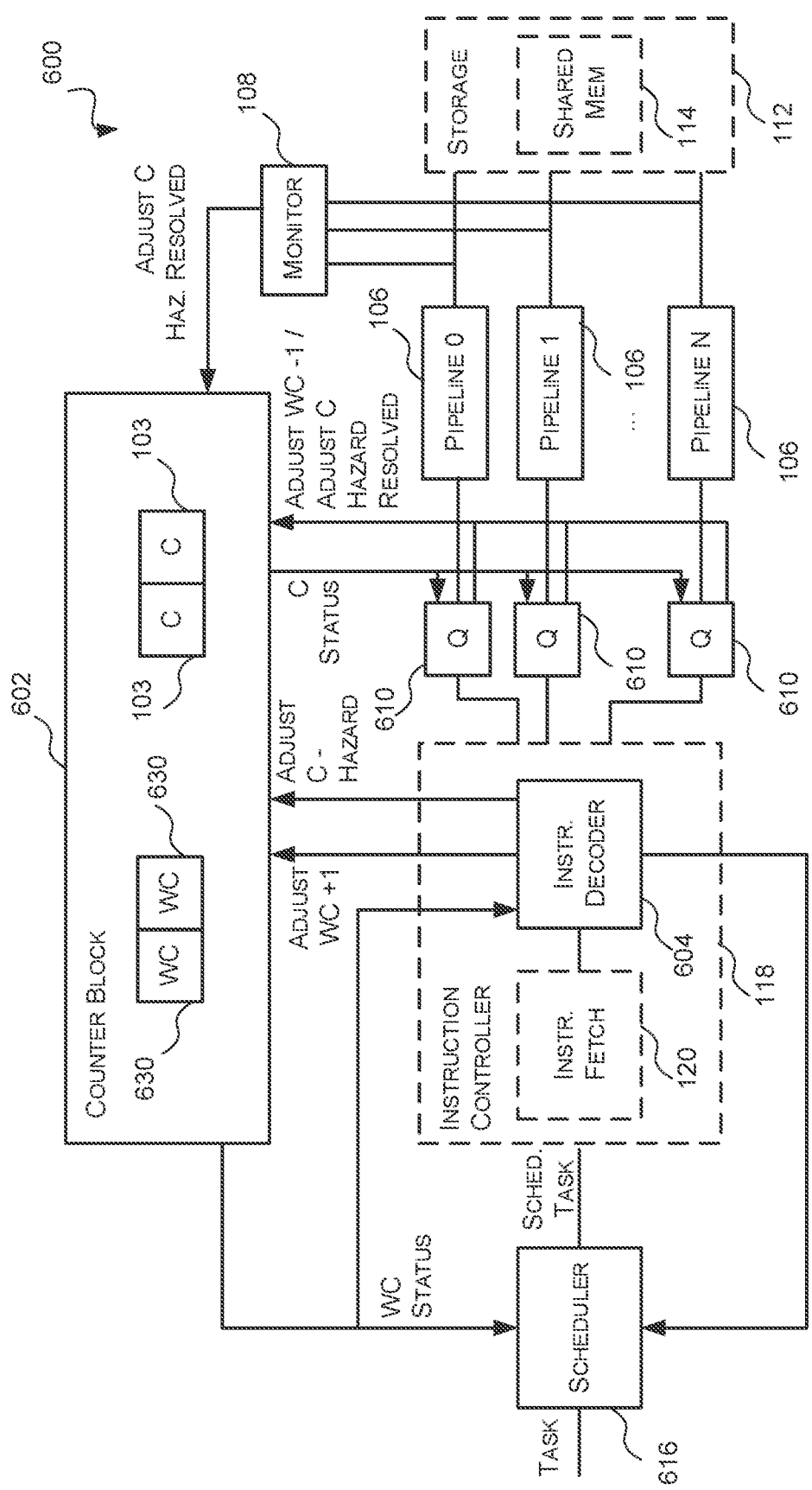
FIG. 6 is a block diagram of a second example parallel processing unit.

Reference is now made to FIG. 6 which illustrates a second example parallel processing unit 600 which may be a GPU or other parallel processing unit that comprises a plurality of wait counters. It will be appreciated that FIG. 6 only shows some elements of the parallel processing unit and there may be many other elements (e.g. caches, interfaces, etc.) within the parallel processing unit that are not shown in FIG. 6. Like the parallel processing unit 100 of FIG. 1, the parallel processing unit 600 of FIG. 6 comprises a counter block 602, an instruction decoder 604, a plurality of instruction pipelines 106, monitor logic 108 and a queue 610 for each instruction pipeline 106.

The counter block 602 of FIG. 6 is that same as the counter block 102 of FIG. 1 except that the counter block 602 of FIG. 6 also comprises a wait counter 630 for each counter 103 to keep track of the number of secondary instructions waiting on the results of that counter 103. In some examples, the wait counters 630 are configured so that a zero value indicates that there are no secondary instructions waiting on the results of the counter 103, and a non-zero value indicates the number of secondary instructions waiting on the results of the counter 103 (e.g. a wait counter value of three indicates that there are three secondary instructions waiting on the results of the counter 103). However, this is an example only and other values may be used to indicate the number of secondary instructions waiting on this counter.

The counter block 602 is configured to adjust the values of the wait counters 630 in response to receiving wait counter adjustment instructions or signals from the instruction decoder 104, and the queues 110; and to generate and provide wait counter status information to the instruction decoder 604 and the scheduler 616. In particular, as described in more detail below, the instruction decoder 604 is configured to send a wait counter adjustment instruction or signal to the counter block 602 that causes the counter block 602 to adjust the value of the wait counter 630 corresponding to a particular counter 103 to indicate that an additional secondary instruction is waiting on the results of the particular counter 103, in response to forwarding a secondary instruction that is dependent on the primary instruction associated with the particular counter 103 to a queue 610. The queues 610 are configured to send a wait counter adjustment instruction or signal to the counter block 602 that causes the counter block 602 to adjust the value of the wait counter 630 corresponding to a particular counter 103 to indicate that one less secondary instruction is waiting on the results of the particular counter 103, in response to (i) forwarding a secondary instruction that is dependent on the primary instruction associated with the particular counter 103 to an instruction pipeline for execution; or (ii) discarding a secondary instruction that is dependent on the primary instruction associated with the particular counter 103.

The wait counter status information comprises information that indicates whether there are any secondary instructing waiting on the results of a counter and is generated by the counter block 602 based on the value of the wait counters 630. In some cases, the wait counter status information may comprise a flag or bit for each wait counter indicating whether there are any secondary instructions waiting on the results of the associated counter 103. For example, the wait counter status information may comprise a flag for each wait counter where a flag is set to "1" to indicate that there is at least one secondary instruction waiting on the results of the associated counter and a flag is set to "0" to indicate that there are no secondary instructions waiting on the results of the associated counter. In other cases, the wait counter status information may comprise the value of each of the wait counters 630 and the recipient of the wait counter status information is configured to determine from the values whether there are any secondary instructions waiting on the results of the corresponding counter 103.

An example implementation of the counter block 602 of FIG. 6 is described below with reference to FIG. 7.

The instruction decoder 604 of FIG. 6 is the same as instruction decoder 104 of FIG. 1 except the instruction decoder 604 is further configured to, in response to forwarding a secondary instruction to a queue 610 for execution, send, for each primary instruction the secondary instruction is dependent on, a wait counter adjustment instruction to the counter block 602 that causes the counter block 602 to adjust the value of a particular wait counter to indicate that an additional secondary instruction is waiting on the results of the associated counter 103. The instruction decoder 604 of FIG. 6 is also further configured to, prior to sending a decoded primary instruction to a queue 610 for execution, determine (from the wait queue status information) whether there are any secondary instructions waiting on the results of the counter associated with the primary instruction. If the instruction decoder 604 determines that there are no secondary instructions waiting on the results of the counter, the instruction decoder 604 sends the primary instruction to a queue 610 for execution. If, however, the instruction decoder 604 determines that there is at least one secondary instruction waiting on the results of the counter, the instruction decoder 604 sends a deactivate instruction or signal (which may also be referred as a de-schedule instruction or signal) to the scheduler 616 to cause the instruction (and/or task it is associated with) to be de-scheduled (or de-activated) until the wait counter status information indicates that there are no secondary instructions waiting on the results of the relevant counter. In some cases, the wait counter status information is automatically pushed to the instruction decoder 604 by the counter block 602 on a periodic basis. In other cases, the instruction decoder 604 is configured to request the wait counter status information from the counter block and in response to receiving the request the counter block 602 provides the wait counter status information to the instruction decoder 604.

The plurality of instruction pipelines 106 are the same as the instruction pipelines 106 of FIG. 1 and as such are configured to execute received instructions.

The monitor logic 108 is the same as the monitor logic 108 of FIG. 1.

The queues 610 of FIG. 6 are the same as the queues 110 of FIG. 1 except that each queue 610 of FIG. 6 is further configured to determine whether the instructions forwarded by the queue 610 to the corresponding instruction pipeline, or instructions discarded by the queue 610 (e.g. because they are inactive), are secondary instructions, and in response to the queue 610 forwarding a secondary instruction to the corresponding instruction pipeline or in response to the queue 610 discarding a secondary instruction, send, for each primary instruction that the secondary instruction is dependent on, a wait counter adjustment instruction or signal to the counter block 602 that causes the counter block 602 to adjust the value of the wait counter corresponding to the counter associated with the primary instruction to indicate that one less secondary instruction is waiting on the results of that counter. In some cases, the wait counter adjustment instruction or signal sent by the queues 610 to the counter block 602 causes the counter block to decrement the value of the wait counter by one.

The parallel processing unit 600 of FIG. 6 also includes a scheduler 616. The scheduler 616 is the same as the scheduler 116 of FIG. 1 except that the instruction scheduler 616 is further configured to, in response to receiving a deactivate instruction or signal from the instruction decoder 604 for an instruction, to de-schedule or deactivate the identified instruction (and the associated task) until the relevant wait counter(s) indicate that there are no more secondary instructions waiting on the results of the associated counter.

As described above, when a task has been sent from the scheduler 616 to the instruction fetch module 120 for execution that task becomes an active task. When the scheduler 616 receives a de-schedule or deactivate message for an instruction related to a task that task becomes an in-active task and is not available to become an active task until the relevant wait counter(s) indicates that there are no more secondary instructions waiting on the result of the corresponding counter. A deactivate or de-schedule instruction may comprise a task ID to identify the task to be de-scheduled/deactivated, a program counter value to indicate the instruction (so that the parallel processing unit can return to that instruction in the program when it is time for the task to be reactivated or rescheduled), and information identifying the relevant wait counter(s) to be monitored (e.g. a wait counter number).

Figure 7:
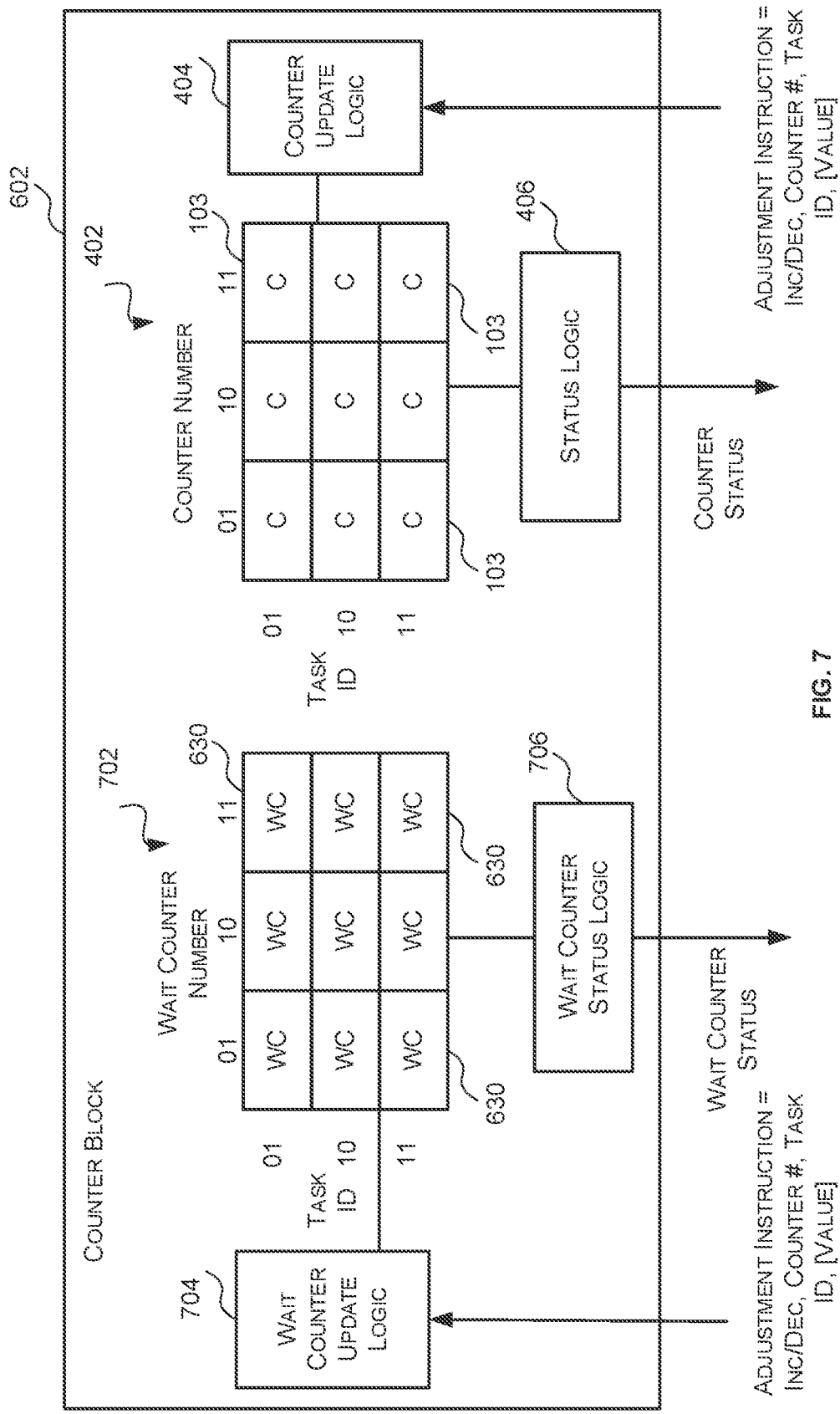
FIG. 7 is a block diagram of an example counter block of FIG. 6.

Reference is now made to FIG. 7 which illustrates an example implementation of the counter block 602 of FIG. 6. The counter block 602 of FIG. 6 comprises the matrix 402 of counters 103, counter update logic 404 and status logic 406 of FIG. 4 which operate as described above with reference to FIG. 4. The counter block 602 of FIG. 6 additionally comprises a matrix 702 of wait counters 630, wait counter update logic 704, and wait counter status logic 706.

The matrix 702 of wait counters 630 comprises one wait counter 630 for each counter 103 in the matrix 402 of counters 103 which is used to track the number of secondary instructions that are waiting for the results of the corresponding counter 103. The matrix 702 of wait counters 630 is arranged in the same manner as the matrix 402 so that the same information that is used to identify a counter 103 (e.g. task ID and counter number) can be used to identify the corresponding wait counter 630. Specifically, the matrix 702 of wait counters comprises a row for each possible task ID. For example, where there are 3 possible task IDs the matrix 702 will have three rows as shown in FIG. 7. Each row comprises K counters where K is the number of counters in each row of the matrix 402 of counters 103.

The wait counter update logic 704 receives wait counter adjustment instructions or signals from the instruction decoder 604 and the queues 610 which causes the value of a wait counter 630 to be adjusted to reflect the number of secondary instructions that are currently waiting on the results of the corresponding counter 103. In particular, as described above in relation to FIG. 6, in response to sending a secondary instruction to a queue 610 for execution the instruction decoder 604, for each primary instruction the secondary instruction is dependent on, sends a wait counter adjustment instruction or signal to the counter block 602 to cause the value of a wait counter corresponding to the counter associated with the primary instruction to be adjusted to have a value that indicates that an additional secondary instruction is waiting on the results of the counter 103. In some examples, the instruction decoder 604 is configured to transmit an adjustment instruction that causes the counter block 602 to increment the value of the wait counter 630 corresponding to the counter 103 by one.

When a queue 610 subsequently detects that a secondary instruction has been sent to an instruction pipeline 106 for execution the queue 610 sends, for each primary instruction the secondary instruction is dependent on, a wait counter adjustment instruction or signal to the counter block 602 to cause the value of the wait counter corresponding to the counter associated with the primary instruction to be adjusted to indicate that one less secondary instruction is waiting on the results of that counter. In some examples, each queue 610 is configured to transmit a wait counter adjustment instruction or signal to the counter block 602 that causes the counter block 602 to decrement the value of the wait counter 630 corresponding to the counter 103 by one.

Also, if a wait queue 610 subsequently detects that a secondary instruction has been discarded (e.g. because it is inactive), the queue 610 sends, for each primary instruction the secondary instruction is dependent on, a wait counter adjustment instruction or signal to the counter block 602 to cause the value of the wait counter corresponding to the counter associated with the primary instruction to be adjusted to indicate that one less secondary instruction is waiting on the results of that counter.

Each wait counter adjustment instruction or signal may comprise, but is not limited to, an indication of whether the instruction is an increment instruction or a decrement instruction, the counter number, the task ID and, optionally the value of the increment or decrement. In some cases, one or more wait counters 630 may only be incremented or decremented by a fixed amount thus the amount of the increment or decrement need not be explicitly provided. The wait counter update logic 704 uses the counter number and the task ID to identify a wait counter 630 in the matrix 702. The wait counter update logic 704 then increments or decrements the value of the identified wait counter 630 based on the wait counter adjustment instructions (e.g. it increments or decrements the value of the counter by a specified or predetermined amount).

Although the wait counter update logic 704 is shown as a single block that increments and decrements the wait counters 630 in the matrix 702, in other examples there may be separate increment and decrement logic blocks which receive and process wait counter increment and decrement instructions respectively. In these cases, the wait counter adjustment instructions may not specify whether the adjustment is an increment or a decrement since this can be automatically determined based on which logic block receives the adjustment instruction.

The wait counter status logic 706 is configured to generate wait counter status information from the value of the wait counters 630 that indicates the status of the wait counters 630 in the matrix 702 and provide the wait counter status information to at least the scheduler 616 and the instruction decoder 604. Providing the wait counter status information to the instruction decoder 604 allows the instruction decoder 604 to determine whether it is safe for a primary instruction to be forwarded to a queue for execution. Providing the wait counter status information to the scheduler 616 allows the scheduler 616 to determine when the instruction/task can be re-scheduled.

As described above, in some cases, the wait counter status information may comprise a bit or flag for each wait counter that indicates whether there are any secondary instructions waiting on the results of the corresponding counter 103. For example, a flag value of "1" may indicate that there is at least one secondary instruction waiting on the results of the corresponding counter 103 and a flag value of "0" may indicate that there are no secondary instructions waiting on the results of the corresponding counter 103. In other cases, the counter status information may comprise the actual values of the wait counters 630 in the matrix 702 and the receivers of the wait counter status information (e.g. the scheduler 616 and the instruction decoder 604) are configured to determine from the counter values whether there are any secondary instructions that are waiting on the results of counter 103.

In some cases, the wait counter status logic 706 may be configured to periodically push the wait counter status information to the scheduler 616 and the instruction decoder 604. In other cases, the scheduler 616 and the instruction decoder 604 may be configured to request the wait counter status information and the wait counter status logic 706 may be configured to provide the wait counter status information in response to such a request.

Figure 8:
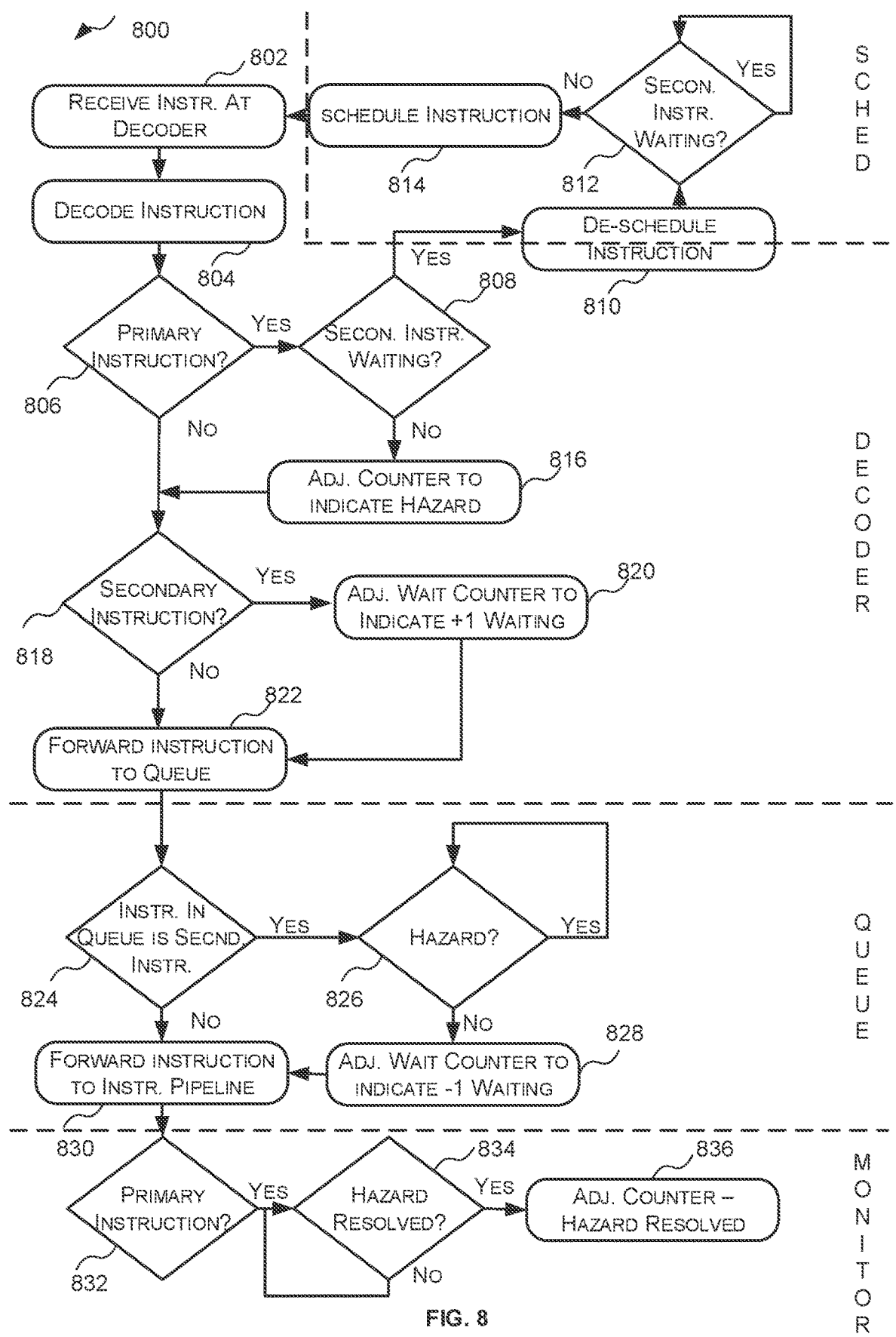
FIG. 8 is a flow diagram of a second example method for avoiding inter-pipeline data hazards.

Reference is now made to FIG. 8 which illustrates a second example method 800 for avoiding inter-pipeline data hazards in a parallel processing unit, such as the parallel processing unit of FIG. 6. The method 800 beings at block 802 where an instruction decoder 604 receives an instruction and at block 804 decodes the instruction. At block 806 the instruction decoder 604 determines (e.g. from the primary instruction field) whether the decoded instruction is a primary instruction. If it is determined (at block 806) that the instruction is a primary instruction then the method 800 proceeds to block 808 where a determination is made, based on the wait counter corresponding to the counter associated with the primary instruction, whether there are any secondary instructions waiting on the results of that counter. If it is determined (at block 808) that there is at least one secondary instruction waiting on the results of the relevant counter then the method 800 proceeds to block 810 where the instruction decoder sends a de-schedule or deactivate instruction or signal to the scheduler 616 to cause the scheduler to deactivate the instruction/task until at block 812 the wait counter corresponding to the counter associated with the primary instruction indicates that there are no secondary instructions waiting on the results of the relevant counter. Once there are no secondary instructions waiting on the results of the relevant counter then at block 814 the instruction/task is re-scheduled and then the method 800 proceeds back to block 802.

If it is determined (at block 808) that there are no secondary instructions waiting on the results of the relevant counter then it is safe to adjust the value of the counter for the new primary instruction so the method 800 proceeds to block 816 where the instruction decoder 604 sends or transmits an adjustment instruction to the counter block that causes the value of the counter associated with the primary instruction to be adjusted to indicate that there is a hazard related to the primary instruction. The method 800 then proceeds to block 818.

If it is determined (at block 806) that the decoded instruction is not a primary instruction then the method proceeds to block 818 where the instruction decoder determines (e.g. from the secondary instruction field) whether the instruction is a secondary instruction. If it is determined that the instruction is a secondary instruction then at block 820 the instruction decoder 604 sends or transmits a wait counter adjustment instruction or signal to the counter block, for each primary instruction the secondary instruction is dependent thereon, that causes the value of the wait counter corresponding to the counter associated with the primary instruction to be adjusted to indicate that there is one more secondary instruction waiting on the results of that counter. The method 800 then proceeds to block 822.

If the instruction decoder 604 determines (at block 818) that the decoded instruction is not a secondary instruction (e.g. from the secondary instruction field) then the method 800 proceeds to block 822 where the instruction is forwarded to the queue associated with the appropriate instruction pipeline. The method 800 then proceeds to block 824.

At block 824, the queue determines whether the received instruction is a secondary instruction. If the queue determines (at block 824) that the received instruction is a secondary instruction then the method 800 proceeds to block 826 where the instruction is stalled if at least one of the counter(s) associated with the primary instruction(s) from which the secondary instruction depends (e.g. as determined from the secondary instruction field) indicate that there is a hazard related to the primary instruction (e.g. the counter is non-zero). Once the counter(s) associated with the primary instruction(s) from which the secondary instruction depends indicate that the hazard related to the primary instruction has been resolved the method 800 proceeds to block 828 where the queue 610 transmits or sends a wait counter adjustment signal to the counter block, for each primary instruction the secondary instruction is dependent thereon, that causes the value of the wait counter corresponding to the counter associated with the primary instruction to be adjusted to indicate that there is one less secondary instruction waiting on the results of that counter. The method 800 then proceeds to block 830.

If the queue determines (at block 824) that the received instruction is not a secondary instruction then the method 800 proceeds directly to block 830 where the instruction is forwarded to the corresponding instruction pipeline 106 for execution. The method 800 then proceeds to block 832.

At block 832, the monitor logic determines whether the instruction in the instruction pipeline is a primary instruction. If the monitor logic detects (at block 832) that the instruction in the instruction pipeline is a primary instruction then the method 800 proceeds to block 834 where the monitor logic determines whether the instruction pipeline has resolved the hazard related to the primary instruction. If the monitor logic 108 determines that the instruction pipeline has resolved the hazard related to the primary instruction the monitor logic 108 sends (at block 836) an adjustment signal or instruction to the counter block that causes the value of the counter associated with the primary instruction to be adjusted to have a value (e.g. zero) that indicates that hazard related to the primary instruction has been resolved.

Stalling secondary instructions right before they are to be executed by an instruction pipeline has shown to improve performance in cases where the primary instruction(s) on which the secondary instruction depends will be completed quickly (e.g. when the primary instruction(s) are executed by an instruction pipeline with a high throughput). Such inter-pipeline data hazards are referred to herein as low latency inter-pipeline hazards. However, stalling secondary instructions right before they are to be executed by an instruction pipeline has shown to reduce performance where the primary instruction(s) on which the secondary instruction depends will be completed slowly (e.g. when the primary instruction(s) are executed by an instruction pipeline with low throughput). Such inter-pipeline data hazards may be referred to herein as high latency inter-pipeline hazards.

Accordingly, in some embodiments described herein the compiler may be configured to separately identify and mark low latency inter-pipeline data hazards and high latency inter-pipeline data hazards. In these embodiments, low the low latency data hazards are processed as described above with reference FIG. 1 (i.e. secondary instructions that are waiting for one or more low latency hazards to clear will wait in a queue preceding the relevant instruction pipeline for the low latency hazard(s) to clear). However high latency data hazards are processed in a different manner. Specifically, if the instruction decoder detects a secondary instruction that is waiting for one or more high latency hazards to clear, instead of sending the secondary instruction to a queue for execution, the instruction is de-scheduled until all relevant high latency inter-pipeline hazards have cleared.

Figure 9:
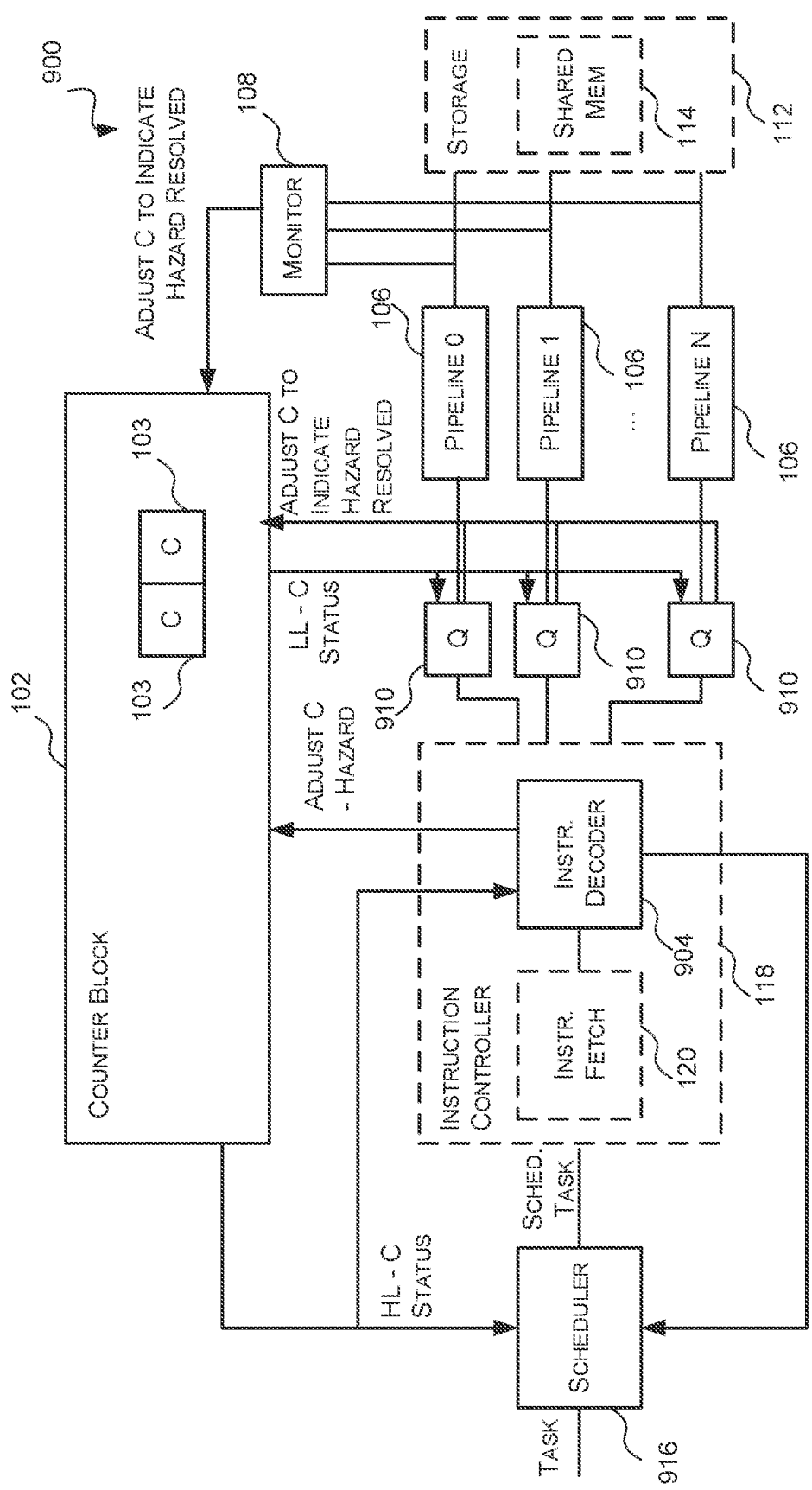
FIG. 9 is a block diagram of a third example parallel processing unit.

Reference is now made to FIG. 9 which illustrates a third example parallel processing unit 900 which may be a GPU or other parallel processing unit that processes high and low latency inter-pipeline data hazards in different manners. It will be appreciated that FIG. 9 only shows some elements of the parallel processing unit and there may be many other elements (e.g. caches, interfaces, etc.) within the parallel processing unit 900 that are not shown in FIG. 9. Like the parallel processing unit 100 of FIG. 1, the parallel processing unit 900 of FIG. 9 comprises a counter block 102, an instruction decoder 904, a plurality of instruction pipelines 106, monitor logic 108, and a queue 910 for each instruction pipeline 106.

The parallel processing unit 900 of FIG. 9 is configured to process instructions that have been generated by a complier that is configured to (i) identify inter-pipeline data hazards; (ii) determine whether the identified inter-pipeline data hazard is a low latency data hazard or a high latency data hazard (e.g. based on the throughput associated with the instruction pipeline that will execute the primary instruction of the inter-pipeline data hazard); and (iii) allocate a counter 103 from a first subset of the counters 103 (e.g. the low latency counters) to a low latency inter-pipeline data hazard and allocate a counter 103 from a second, different, subset of the counters 103 (e.g. the high latency counters) to a high latency inter-pipeline data hazard. Accordingly, the instructions that are processed by the parallel processing unit 900 of FIG. 9 include information (inserted at build time—e.g. by a compiler) that identify primary instructions (i.e. instructions from which at least one other instruction in another instruction pipeline is dependent on), secondary instructions (i.e. instructions that are dependent on at least one primary instruction in another pipeline), the counter(s) they are associated with, and information indicating whether or not the associated hazard is a low latency hazard or a high latency hazard.

Figure 10:
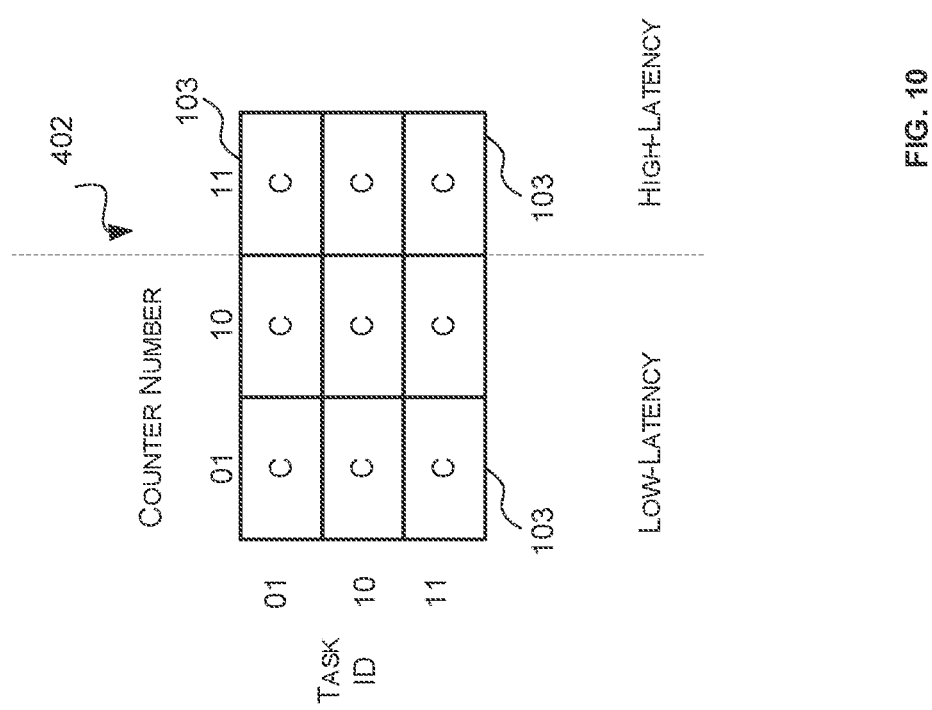
FIG. 10 is a schematic diagram of an example counter block of FIG. 9.

For example, as shown in FIG. 10, if there are three counters numbered 1 to 3 (e.g. for each possible task ID) then a first set of counters formed by counters 1 and 2 may be allocated to low latency inter-pipeline data hazards and a second set of counters formed by counter 3 may be allocated to high latency inter-pipeline data hazards. The counter number associated with a primary instruction or a secondary instruction can be used by the parallel processing unit 900 to determine whether the primary instruction or the secondary instruction is associated with a low latency inter-pipeline data hazard or a high latency inter-pipeline data hazard and process it accordingly.

Returning to FIG. 9, the counter block 102 is the same as the counter block 102 of FIG. 1 except that the counter block 102 is further configured to provide counter status information to the scheduler 916 and the instruction decoder 904. Specifically, the counter block 102 comprises a plurality of counters 103 which are used to track inter-pipeline data hazards. The counter block 102 receives an adjustment instruction or signal from the instruction decoder 904 to adjust the value of a counter to indicate that there is a hazard related to the associated primary instruction when the instruction decoder forwards a primary instruction to a queue 910 for execution; and the counter block 102 subsequently receives an adjustment instruction or signal from the monitor logic 108 to adjust the value of the counter to indicate that the hazard related to the associated primary instruction has been resolved when the monitor logic 108 detects that an instruction pipeline has resolved a hazard related to a primary instruction. The counter block also provides counter status information to the queues 910, the scheduler 916 and the instruction decoder 904 that indicates, for each counter, whether there is hazard related to the primary instruction associated therewith. The fact that one or more of the counters 103 is/are designated for use with low latency inter-pipeline data hazards and one or more of the counters 103 is/are designated for use with high latency inter-pipeline data hazards does not affect the operation of the counter block 102.

The instruction decoder 904 generally corresponds to the instruction decoder 104 of FIG. 1 in that it is configured to receive instructions, decode the received instructions, forward the decoded instructions to a queue 910 associated with an appropriate pipeline for execution; and in response to forwarding a primary instruction (whether related to a low latency inter-pipeline data hazard or a high latency inter-pipeline data hazard) to a queue 910 for execution send an adjustment instruction to the counter block to cause the value of the counter associated with the primary instruction to be adjusted to indicate that there is hazard related to the primary instruction (e.g. send an adjustment instruction to increment the value of the counter associated with the primary instruction by a predetermined amount (e.g. 8)).

However, instead of automatically forwarding all decoded secondary instructions to queues 910 for execution like the instruction decoder 104 of FIG. 1, the instruction decoder 904 of FIG. 9 is configured to, prior to forwarding a decoded secondary instruction to a queue 910 for execution, determine (e.g. from the counter numbers associated therewith) whether the secondary instruction is related to at least one high latency data hazard. If it is determined that the secondary instruction is not related to any high latency data hazards the instruction decoder 904 forwards the secondary instruction to a queue 910 for execution.

If, however, it is determined that the secondary instruction is related to at least one high latency data hazard then the instruction decoder 904 determines from the counter status information provided by the counter block 102 whether each high latency inter-pipeline data hazard associated with the secondary instruction has been resolved. If the counter status information indicates that all high latency data hazards associated with the secondary instruction have been resolved (e.g. any high latency counters associated with the secondary instruction indicate that the high latency data hazard has been resolved) then the secondary instruction is forwarded to a queue 910 for execution. If, however, the counter status information indicates that at least one of the high latency hazards associated with the secondary instruction has not been resolved then a deactivation instruction or signal is sent to the scheduler 916 to cause the scheduler to deactivate the instruction (and/or task associated therewith). The deactivation instruction may comprise information identifying the instruction (e.g. the value of the program counter) and information identifying the high latency counters to be monitored, and where the instruction is part of a task, the deactivation message may also comprise information identifying the task (e.g. a task ID).

The plurality of instruction pipelines 106 are the same as the instruction pipelines 106 of FIG. 1 and as such are configured to execute received instructions.

The monitor logic 108 is the same as the monitor logic 108 of FIG. 1.

The queues 910 are the same as the queues 110 of FIG. 1 except that the queues 910 of FIG. 9 are only configured to stall a secondary instruction while a low latency counter (instead of any counter) associated with the secondary instruction indicates there is a hazard related to the associated primary instruction.

The parallel processing unit 900 of FIG. 9 also includes a scheduler 916. The scheduler 916 is the same as the scheduler 116 of FIG. 1 except that the scheduler 916 of FIG. 9 is further configured to, in response to receiving a deactivate instruction or signal from the instruction decoder 904 for a secondary instruction, de-schedule or deactivate the identified secondary instruction (and the associated task) until the high latency counters associated with the secondary instruction indicate that the high latency data hazard(s) has/have been resolved.

As described above, when a task has been sent from the scheduler 916 to the instruction fetch module for processing that task becomes an active task. When the scheduler 916 receives a de-schedule or deactivate message for an instruction the associated task becomes an in-active task and is not available to become an active task until the relevant high latency counter(s) indicate that the relevant high latency hazards have been resolved. A deactivate or de-schedule instruction may comprise information identifying the instruction (e.g. a program counter value) to be de-scheduled/deactivated, information identifying the task the instruction is associated with (e.g. a task ID), and information identifying the high latency counters to be monitored (e.g. counter numbers).

Figure 11:
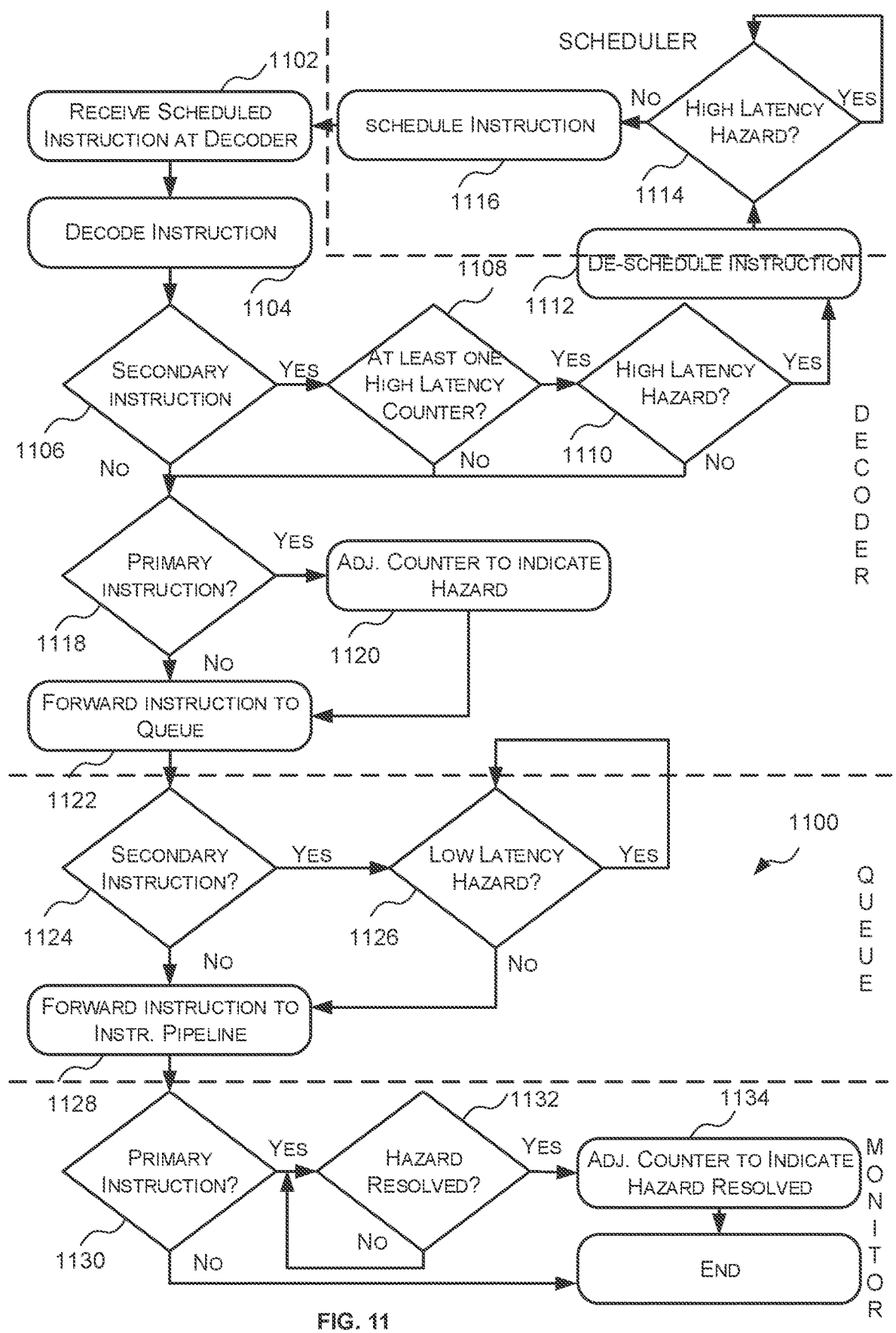
FIG. 11 is a flow diagram of a third example method for avoiding inter-pipeline data hazards.

Reference is now made to FIG. 11 which illustrates a third example method 1100 for avoiding inter-pipeline data hazards in a parallel processing unit, such as the parallel processing unit 900 of FIG. 9. The method 1100 beings at block 1102 where an instruction decoder 904 receives an instruction and decodes (at block 1104) the instruction. At block 1106, the instruction decoder 904 determines (e.g. from the secondary instruction field) whether the decoded instruction is a secondary instruction. If (at block 1106) it is determined that the instruction is a secondary instruction then the method 1100 proceeds to block 1108 where a determination is made, from the number of the counter associated with each primary instruction from which it depends whether the instruction relates to at least one high latency inter-pipeline hazard. If it is determined (at block 1108) that the secondary instruction relates to at least one high latency inter-pipeline data hazard then the method 1100 proceeds to block 1110 where the instruction decoder 904 determines if the relevant high latency counters from which the secondary instruction depends indicate that the there is a high latency hazard related to the primary instruction. If (at block 1110) it is determined that the relevant high latency counters indicate that there is a high latency hazard related to the primary instruction the method 1100 proceeds to block 1112 where the instruction decoder 904 sends a de-schedule or deactivate instruction or message to the scheduler which causes the scheduler to deactivate the instruction/task until at block 1114 the relevant high latency counter(s) indicate that the high latency hazard related to the primary instruction(s) has/have been resolved. Once the relevant high latency counters indicate that the high latency hazard related to the primary instruction(s) have been resolved then at block 1116 the instruction/task is re-scheduled and the method 1100 proceeds back to block 1102.

If it is determined (at block 1108) that the secondary instruction is not associated with any high latency counters, or (at block 1110) that the relevant high latency hazard(s) have been resolved the method proceeds to block 1118.

If it is determined (at block 1106) that the decoded instruction is not a secondary instruction then the instruction decoder determines (at block 1118) (e.g. from the primary instruction field) whether the instruction is a primary instruction. If it is determined that the instruction is a primary instruction then at block 1120 the instruction decoder 904 sends or transmits a counter adjustment instruction or signal to the counter block that causes the value of the counter associated with the primary instruction to be adjusted to indicate that there is a hazard related to the primary instruction. The method (1100) then proceeds to block 1122.

If the instruction decoder determines (at block 1118) that the decoded instruction is not a primary instruction (e.g. from the primary instruction field) then the method 1100 proceeds to block 1122 where the instruction is forwarded to the queue associated with the appropriate instruction pipeline. Then at block 1124 the queue 910 determines whether the received instruction is a secondary instruction. If the queue 910 determines (at block 1124) that the received instruction is a secondary instruction then the method 1100 proceeds to block 1126 where the instruction is stalled until the low latency counter(s) associated with the primary instruction(s) from which the secondary instruction depends indicate that the low latency hazard related to the primary instruction has been resolved (e.g. the counter is zero). Once the low latency counter(s) associated with the primary instruction(s) from which the secondary instruction depends indicate that the low latency hazard related to the primary instruction has been resolved the method 1100 proceeds to block 1128.

If the queue 910 determines (at block 1124) that the received instruction is not a secondary instruction then the method 1100 proceeds directly to block 1128 where the instruction is forwarded to the corresponding instruction pipeline for execution.

At block 1130, the monitor logic determines whether the instruction in the instruction pipeline is a primary instruction. If the monitor logic determines (at block 1130) that the instruction in the instruction pipeline is a primary instruction then the method 1100 proceeds to block 1132 where the monitor logic determines whether the instruction pipeline has resolved the hazard related to the primary instruction. If the monitor logic 108 determines that the instruction pipeline has resolved the hazard related to the primary instruction the monitor logic 108 sends (at block 1134) an adjustment signal or instruction to the counter block that causes the value of the counter associated with the primary instruction to be adjusted to indicate that the hazard related to the primary instruction has been resolved.

Although not shown, in other examples the wait counters described with reference to FIGS. 6 to 8 may be combined with the low latency/high latency processing of inter-pipeline data hazards described with reference FIGS. 9 to 11. In these examples, there may only be a wait counter for each of the low latency counters.

Figure 12:
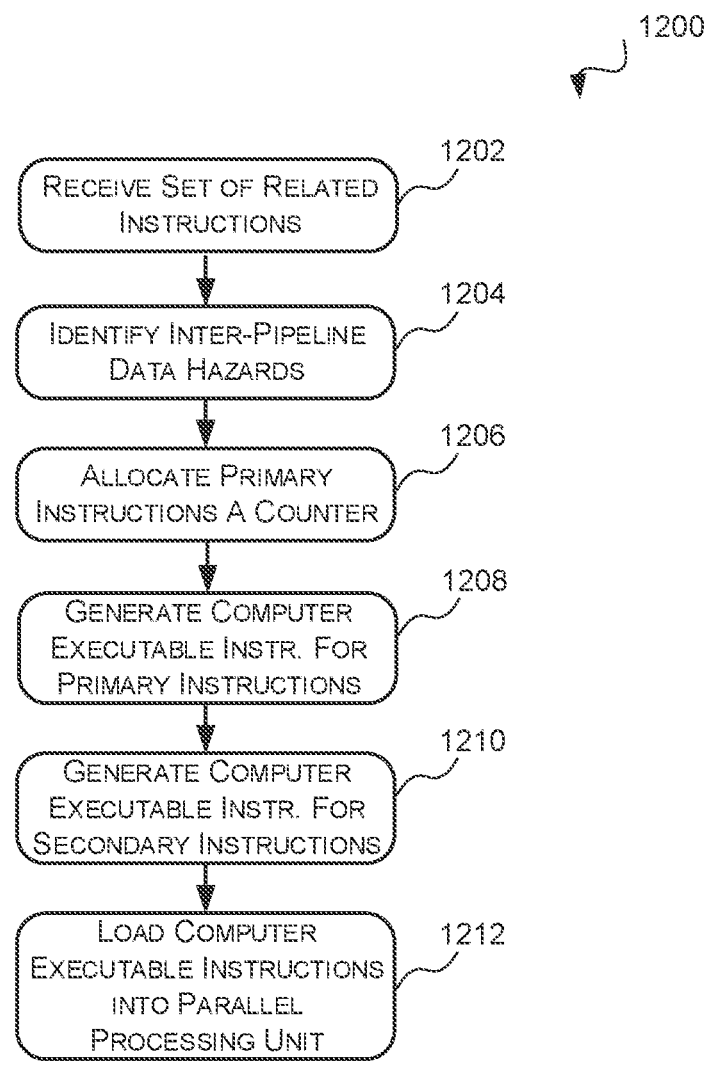
FIG. 12 is a flow diagram of an example method of generating instructions for execution on a parallel processing unit.

Reference is now made to FIG. 12 which illustrates an example method 1200 for generating instructions to be executed by the parallel processing unit 100, 600 of FIGS. 1 and 6. The method 1200 begins at block 1202 where a set of related instructions (e.g. instructions forming a program) are received (e.g. at a compiler). The set of related instructions may be in any suitable format. For example, in some cases the set of related instructions may be in a machine language. Once the set of related instructions have been received the method 1200 proceeds to block 1204.

At block 1204, the instructions are analysed (e.g. by the compiler) to identify inter-pipeline data hazards in the set of related instructions. As described above, an inter-pipeline data hazard exists when an instruction to be executed in one pipeline can only safely execute after another instruction to be executed in a different instruction pipeline has performed a data action (e.g. a read or write of data). There are generally three types of data hazards that may occur—a WAR hazard, a RAW hazard and WAW hazard.

The instruction that performs the action is referred to herein as the primary instruction and the instruction that is waiting on the action by the primary instruction is referred to as the secondary instruction. For example, in a WAR hazard the read instruction is the primary instruction and the write instruction is the secondary instruction; in a RAW hazard the write instruction is the primary instruction and the read instruction is the secondary instruction; and in a WAW hazard the first write instruction is the primary instruction and the second write instruction is the secondary instruction. The secondary instruction is said to be dependent on the primary instruction. As described above, there may be more than one secondary instruction that is dependent on the same primary instruction.

In some cases, the compiler may be configured to identify inter-pipeline data hazards (and the primary and secondary instruction thereof) in the set of related instructions by analysing the operands of the instructions to identify WAR, RAW and WAW hazards. In other cases, the set of instructions may include information (e.g. manually inserted by a programmer or developer) indicating inter-pipeline data hazards in the set of instructions and the compiler may be configured to identify the inter-pipeline data hazards (and the primary and secondary instructions thereof) in the set of instructions based on this information. Once the inter-pipeline data hazards have been identified the method 1200 proceeds to block 1206.

At block 1206, each primary instruction of an identified inter-pipeline data hazard is allocated (e.g. by the compiler) a counter (e.g. a counter number) of a plurality of counters (e.g. counters 103) for tracking the identified inter-pipeline data hazard. As described above, in some cases the counters may be allocated to the primary instructions in a manner that maximizes the time between reuse of the counters (e.g. in a round-robin manner). Once a counter has been allocated to each primary instruction the method 1200 proceeds to block 1208.

At block 1208, a computer executable instruction is generated (e.g. by the compiler) for each primary instruction such that the computer executable instruction comprises information that identifies the primary instruction as a primary instruction and information that identifies the counter allocated to the primary instruction. As described above with respect to FIG. 2, in some cases the generated computer executable instructions may comprise a primary instruction field that comprises the information indicating the computer executable instruction is a primary instruction and the information identifying the counter allocated to the primary instruction. For example, the primary instruction field may be configured to hold a number and when the number is a predetermined value (e.g. zero) it indicates that the instruction is not a primary instruction and when the number is not the predetermined value (e.g. a non-zero value) it indicates that the instruction is a primary instruction and the number represents a number of the counter associated with the primary instruction. Once computer readable instructions have been generated for the primary instructions, the method 1200 proceeds to block 1210.

At block 1210, a computer executable instruction is generated (e.g. by the compiler) for each secondary instruction such that the computer executable instruction comprises information identifying the computer executable instruction as a secondary instruction and information identifying the counter allocated to the corresponding primary instruction. As described above with respect to FIG. 2, in some cases the generated computer executable instructions comprise a secondary instruction field that comprises the information indicating the computer executable instruction is a secondary instruction and the information identifying the counter allocated to the corresponding primary instruction. For example, the secondary instruction field may be configured to hold a bit mask wherein each bit of the bit mask corresponds to a counter of the plurality of counters and when a bit of the mask is set it indicates that the instruction is a secondary instruction that is dependent on the primary instruction associated with the corresponding counter. Once computer readable instructions have been generated for the secondary instructions, the method 1200 proceeds to block 1212.

At block 1212, the computer executable instructions generated in blocks 1208 and 1210 are loaded into memory of, or accessible by, the parallel processing unit.

Although in the example method 1200 of FIG. 12 all inter-pipeline data hazards are identified and then counters are allocated thereto and executable instructions generated for the primary and secondary instructions thereof, in other examples, after each inter-pipeline data hazard has been identified a counter may be allocated to the primary instruction and the computer executable instructions are generated for the primary and secondary instructions to include information that indicates them as such and identifies the counter allocated to the primary instruction.

When the instructions generated by the method 1200 of FIG. 12 are intended to be executed by a parallel processing unit, such as the parallel processing unit of FIG. 9, which is configured to process low latency inter-pipeline data hazards differently than high latency inter-pipeline data hazards, the counters used for tracking the data hazards may be divided into two sets and counters from one set may be allocated to the primary instructions of low latency data hazards and counters from the other set may be allocated to the primary instructions of high latency data hazards. As described above, the parallel processing unit can then determine whether to process a hazard as a low latency hazard or a high latency hazard based on the counter allocated to the corresponding primary instruction.

Figure 13:
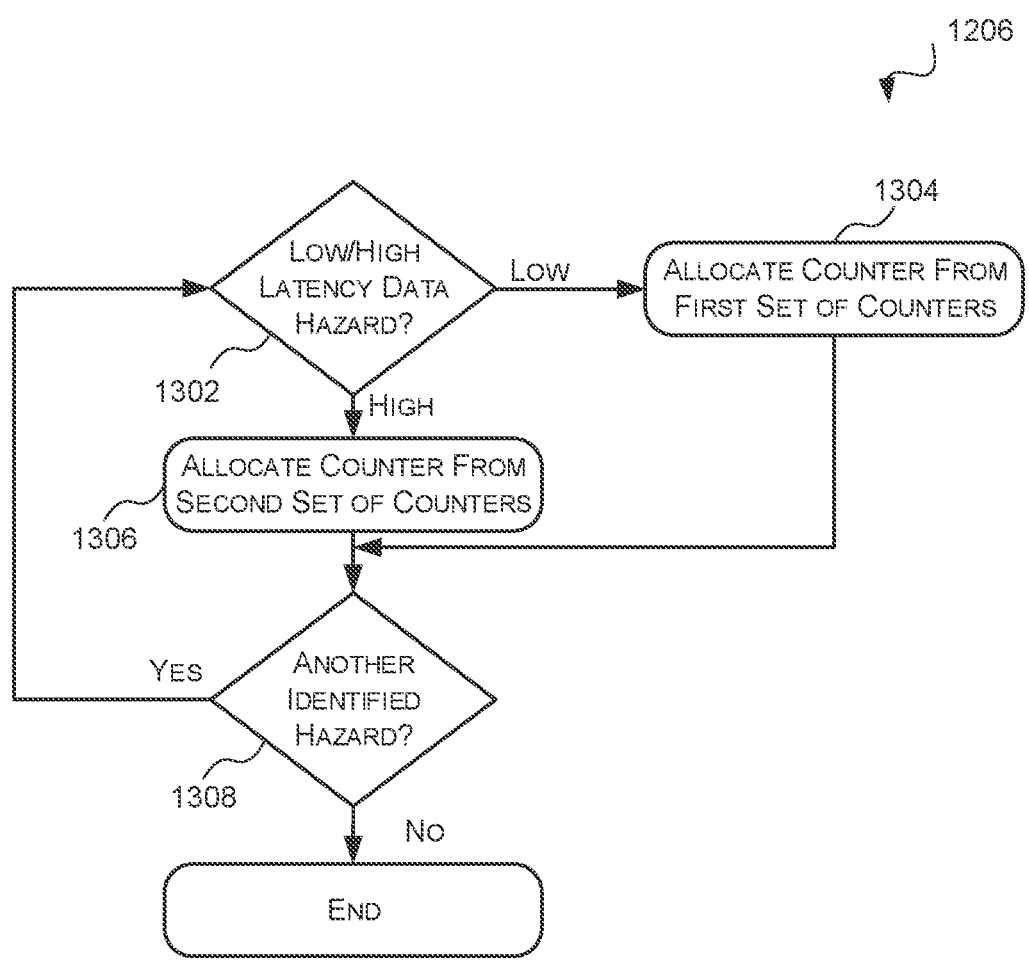
FIG. 13 is a flow diagram of an example method of allocating counters to the primary instructions.

Reference is now made to FIG. 13 which illustrates an example method of allocating counters to the primary instructions (block 1206) wherein primary instructions of high latency data hazards are allocated counters from one set of counters and primary instructions of low latency data hazards are allocated counters from another set of counters. The method 1206 begins at block 1302 where a determination is made for an identified inter-pipeline data hazard whether the inter-pipeline data hazard is a low latency data hazard or a high latency data hazard. The determination may be based on the throughput of the instruction pipeline (e.g. instruction pipeline 106) that will execute the primary instruction of the identified inter-pipeline data hazard. The throughput provides an indicator of how quickly the instruction pipeline processes instructions. Generally, the higher the throughput the more quickly an instruction pipeline processes instructions. An instruction pipeline with a throughput above, or equal, to a predetermined threshold may be considered a high throughput instruction pipeline and a primary instruction that is to be executed by a high throughput instruction pipeline may be considered to be related to a low latency inter-pipeline data hazard. Conversely an instruction pipeline with a throughput below the predetermined threshold may be considered a low throughput instruction pipeline and a primary instruction that is to be executed by a low throughput instruction pipeline may be considered to be related to a high latency inter-pipeline data hazard. The determination of which instruction pipeline will execute the primary instruction may be based on the type of primary instruction, which may be identified, for example, by the operation code ("opcode") of the primary instruction.

If it is determined that the primary instruction is associated with a low latency hazard the method 1206 proceeds to block 1304 where the primary instruction is allocated (e.g. by the compiler) a counter from a first set of counters (e.g. counters 0 to 3). The method 1206 then proceeds to block 1308. If, however, it is determined that the primary instruction is associated with a high latency hazard the method 1206 proceeds to block 1306 where the primary instruction is allocated (e.g. by the compiler) a counter from a second set of counters (e.g. counters 4 to 7). The method 1306 then proceeds to block 1308.

At block 1308 at determination is made as to whether there are any more identified inter-pipeline data hazards. If, there is at least one more identified inter-pipeline data hazards the method proceeds back to block 1302. If there are no more identified inter-pipeline data hazards (i.e. all primary instructions have been allocated a counter) then the method 1206 ends.

Figure 14:
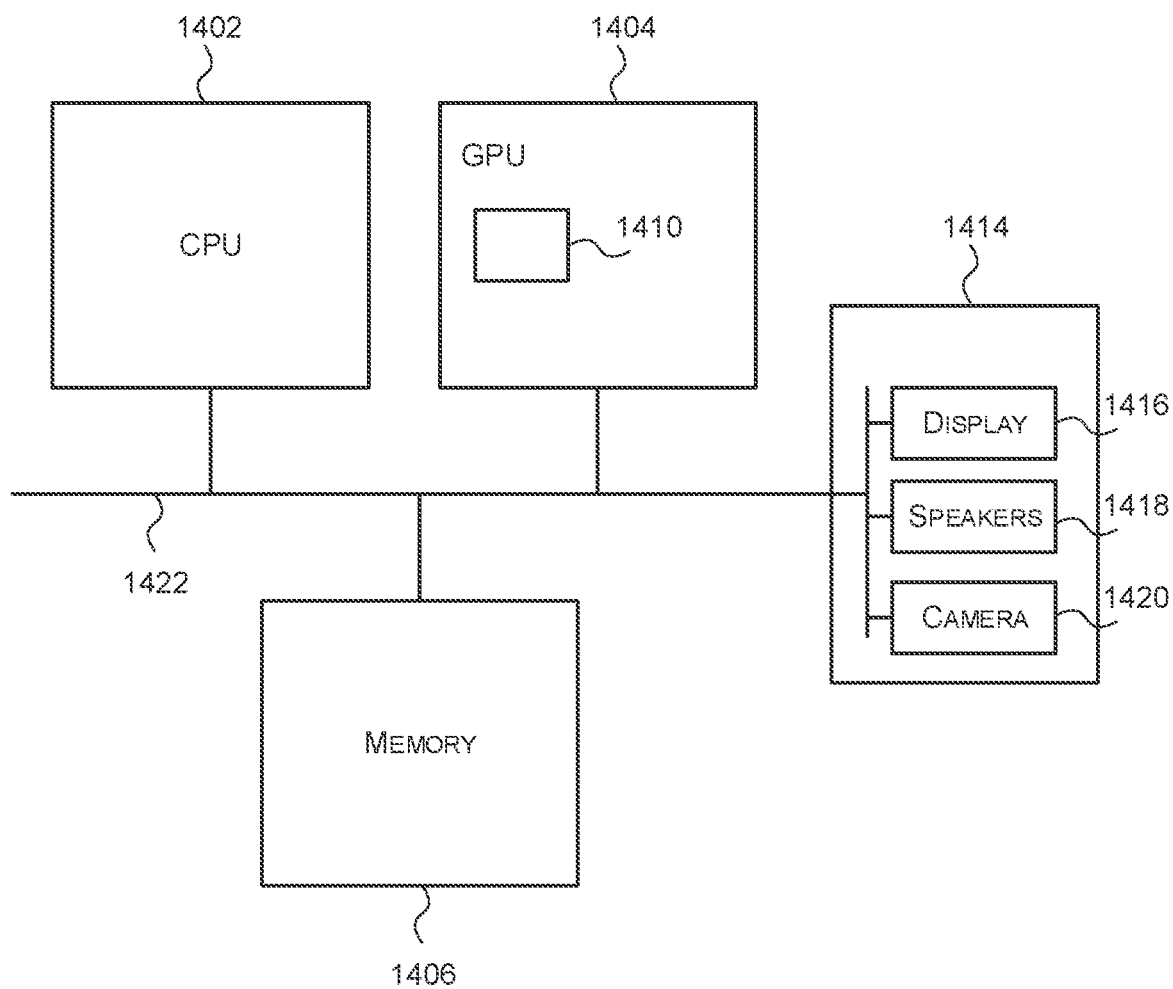
FIG. 14 is a block diagram of an example computer system in which a parallel processing unit described herein is implemented.

FIG. 14 shows a computer system in which the parallel processing units 100, 600, 900 described herein may be implemented. The computer system comprises a CPU 1402, a GPU 1404, a memory 1406 and other devices 1414, such as a display 1416, speakers 1418 and a camera 1420. The parallel processing unit 1410 (corresponding to any of the parallel processing units 100, 600 or 900) is shown implemented within the GPU 1404. In other examples, the parallel processing unit 1410 may be implemented within the CPU 1402. The components of the computer system can communicate with each other via a communications bus 1422.

The parallel processing units, queues, and counter blocks of FIGS. 1, 3, 4, 6, 7 and 9 are shown as comprising a number of functional blocks. This is schematic only and is not intended to define a strict division between different logic elements of such entities. Each functional block may be provided in any suitable manner. It is to be understood that intermediate values described herein as being formed by an element of the parallel processing unit, queue, or counter blocks need not be physically generated by the parallel processing unit, queue or counter block at any point and may merely represent logical values which conveniently describe the processing performed by the parallel processing unit, queue, or counter block between its input and output.

The parallel processing units, queues, and/or counter blocks described herein may be embodied in hardware on an integrated circuit. The parallel processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, parallel processing unit, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a system configured to perform any of the methods described herein, or to manufacture a processor or a parallel processing unit comprising any apparatus described herein. An integrated circuit definition dataset may be, for example, an integrated circuit description.

There may be provided a method of manufacturing, at an integrated circuit manufacturing system, a parallel processing unit, queue and/or counter block as described herein. There may be provided an integrated circuit definition dataset that, when processed in an integrated circuit manufacturing system, causes the method of manufacturing a parallel processing unit, queue and/or counter block to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a parallel processing unit (e.g. parallel processing unit 100, 600 or 900) will now be described with respect to FIG. 15.

Figure 15:
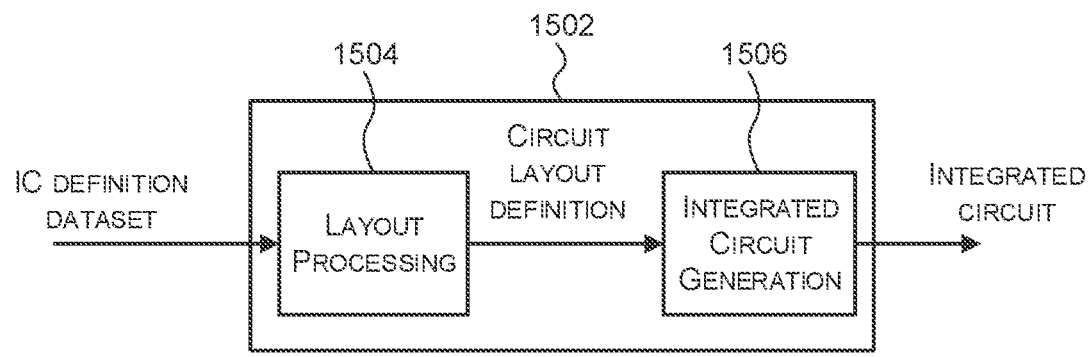
FIG. 15 is a block diagram of an example integrated circuit manufacturing system for generating an integrated circuit embodying a system to implement the parallel processing units described herein.

FIG. 15 shows an example of an integrated circuit (IC) manufacturing system 1502 which is configured to manufacture a parallel processing unit (e.g. parallel processing unit 100, 600 or 900) as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining a parallel processing unit (e.g. parallel processing unit 100, 600 or 900) as described in any of the examples herein), process the IC definition dataset, and generate an IC according to the IC definition dataset (e.g. which embodies a parallel processing unit (e.g. parallel processing unit 100, 600 or 900) as described in any of the examples herein). The processing of the IC definition dataset configures the IC manufacturing system 1502 to manufacture an integrated circuit embodying a parallel processing unit (e.g. parallel processing unit 100, 600 or 900) as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a parallel processing unit (e.g. parallel processing unit 100, 600 or 900) without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

Further examples are now provided by way of clauses.

Clause 1. A computer-implemented method 1200 of generating computer executable instructions for a parallel processing unit, the method 1200 comprising, by a processor: receiving 1202 a plurality of related instructions; identifying 1204 data hazards in the plurality of related instructions, each data hazard comprising a primary instruction and one or more secondary instructions; allocating 1206 each primary instruction a counter of a plurality of counters for tracking the identified data hazard; generating 1208 a computer executable instruction for each primary instruction that comprises information indicating that the computer executable instruction is a primary instruction and information identifying the counter allocated to the primary instruction; and generating 1210 a computer executable instruction for each secondary instruction that comprises information indicating that the computer executable instruction is a secondary instruction and information identifying the counter allocated to the corresponding primary instruction; and loading 1212 the computer executable instructions into the parallel processing unit.

Clause 2. The method 1200 of clause 1, wherein each computer executable instruction comprises a primary instruction field and a secondary instruction field, the primary instruction field configured to comprise the information indicating that the computer executable instruction is a primary instruction and the information identifying the counter allocated to the primary instruction, and the secondary instruction field configured to comprise the information indicating that the computer executable instruction is a secondary instruction and the information identifying the counter allocated to the corresponding primary instruction.

Clause 3. The method 1200 of clause 2, wherein the primary instruction field is configured to hold a number and when the number is a predetermined value it indicates that the instruction is not a primary instruction and when the number is not the predetermined value it indicates that the instruction is a primary instruction and the number represents a number of the counter allocated to the primary instruction.

Clause 4. The method 1200 of clause 2 or clause 3, wherein the secondary instruction field is configured to hold a bit mask wherein each bit of the bit mask corresponds to a counter of the plurality of counters and when a bit of the mask is set it indicates that the instruction is a secondary instruction that is dependent on the primary instruction allocated the corresponding counter.

Clause 5. The method 1200 of any of clauses 2 to 4, wherein allocating a primary instruction a counter for tracking the identified data hazard comprises determining 1302 whether the identified data hazard is a high latency data hazard or a low latency data hazard, and allocating 1304 the primary instruction a counter from a first subset of the plurality of counters when the identified data hazard is a high latency data hazard, and allocating 1306 the primary instruction a counter from a second subset of the plurality of counters when the identified data hazard is a low latency data hazard.

Clause 6. The method 1200 of clause 5, wherein the determination of whether an identified data hazard is a high latency data hazard or a low latency data hazard is based on a throughput associated with an instruction pipeline to execute the primary instruction of the identified data hazard.

Clause 7. The method 1200 of clause 6, wherein an identified data hazard is a high latency data hazard if the throughput associated with the instruction pipeline to execute the primary instruction of the identified data hazard is greater than or equal to a predetermined threshold and the identified data hazard is a low latency data hazard otherwise.

Clause 8. The method 1200 of clause 6 or clause 7, wherein the instruction pipeline to execute the primary instruction of the identified data hazard is based on a type of the primary instruction.

Clause 9. The method 1200 of any of clauses 1 to 8, wherein the parallel processing unit comprises a plurality of parallel instruction pipelines, and identifying data hazards within the plurality of related instructions comprises identifying inter-pipeline data hazards within the plurality of related instructions.

Clause 10. The method 1200 of any of clauses 1 to 9, wherein the parallel processing unit is configured to track data hazards using the counters identified in the computer readable instructions.

Clause 11. The method 1200 of any of clauses 1 to 10, wherein the parallel processing unit is configured to: in response to a decoder of the parallel processing unit outputting a primary instruction for execution, adjust the counter allocated to the primary instruction to indicate a data hazard related to that primary instruction; in response to detecting that the data hazard related to a primary instruction has been resolved, adjust the counter allocated to the primary instruction to indicate the data hazard has been resolved; and in response to the decoder outputting a secondary instruction for execution, stalling the secondary instruction if at least one counter allocated to a primary instruction from which the secondary instruction depends indicates there is data hazard related to the primary instruction.

Clause 12. The method 1200 of any of clauses 1 to 11, wherein the parallel processing unit comprises. a plurality of counters 103; a plurality of queues 110, 610, 910, each queue 110, 610, 910 preceding one instruction pipeline of a plurality of instruction pipelines 106; an instruction decoder 104, 604, 904 configured to: decode a received instruction; in response to determining the decoded instruction is a primary instruction from which at least one other instruction is dependent on, cause a value of a counter 103 of the plurality of counters allocated to the primary instruction to be adjusted to indicate that there is a hazard related to the primary instruction; and forward the decoded instruction to one of the plurality of queues 110, 610, 910; and monitor logic 108 configured to monitor the plurality of instruction pipelines 106, and in response to detecting that an instruction pipeline 106 has resolved a hazard related to a primary instruction, cause the value of the counter allocated to the primary instruction to be adjusted to indicate that the hazard related to the primary instruction has been resolved; wherein each queue 110, 610, 910 is configured to, in response to receiving a secondary instruction that is dependent on one or more primary instructions, stall execution of the secondary instruction by the associated instruction pipeline 106 if a counter 103 allocated to a primary instruction from which the secondary instruction depends indicates that there is a hazard related to that primary instruction.

Clause 13. The method of any of clauses 1 to 12, wherein a primary instructions is an instructions from which one or more instructions depends and a secondary instructions is an instructions that depends on one or more primary instructions.

Clause 14. Computer program code for performing the method of any of clauses 1 to 13.

Clause 15. A non-transitory computer readable storage medium having stored thereon computer readable instructions that, when executed at a computer system, cause the computer system to perform the method of any of clauses 1 to 13.

What is claimed is:

1. A method of processing instructions in a parallel processing unit comprising a plurality of instruction pipelines, the method comprising:
   tracking data hazards using a plurality of counters, the plurality of counters comprising a first set of counters associated with high latency data hazards and a second set of counters associated with low latency data hazards; and
   at an instruction decoder:
      receiving an instruction for execution that indicates (i) whether the instruction is a primary instruction from which at least one other instruction is dependent and if so, a counter of the plurality of counters the primary instruction is associated with and (ii) whether the instruction is a secondary instruction and if so, the counters of the plurality of counters associated with the primary instructions from which the instruction depends,
      determining whether the instruction is a secondary instruction,
      if it is determined that the instruction is a secondary instruction, determining from the counters associated with the primary instructions from which the instruction depends, whether the instruction relates to at least one high latency data hazard,
      if it is determined that the instruction relates to at least one high latency data hazard, determining from the plurality of counters whether each high latency data hazard related to the instruction has been resolved,
      if it is determined that at least one high latency data hazard related to the instruction has not been resolved, causing the instruction to be de-scheduled until each high latency data hazard related to the instruction has been resolved, and
      if it is determined that the instruction does not relate to at least one high latency data hazard or that all of the high latency data hazards related to the instruction have been resolved, forwarding the instruction to a queue preceding an appropriate instruction pipeline where the instruction stalls until all low latency data hazards related to the instruction have been resolved.

2. The method of claim 1, further comprising, at the instruction decoder:
   prior to forwarding the instruction to the queue preceding an appropriate instruction pipeline, determining whether the instruction is a primary instruction; and
   if it is determined that the instruction is a primary instruction, causing the counter associated with the instruction to be adjusted to indicate that there is a hazard for that primary instruction.

3. The method of claim 1, further comprising, at the instruction decoder:
   if it is determined that the instruction is not a secondary instruction, determining whether the instruction is a primary instruction; and
   if it is determined that the instruction is a primary instruction, causing the counter associated with the instruction to be adjusted to indicate that there is a hazard for that primary instruction and forwarding the instruction to a queue preceding an appropriate instruction pipeline.

4. The method of claim 2, further comprising, in response to determining that the hazard for a primary instruction has been resolved, causing the counter associated with the primary instruction to be adjusted to indicate that the hazard for the primary instruction has been resolved.

5. The method of claim 2, further comprising, in response to determining at the instruction decoder that the instruction is a primary instruction, determining whether a wait counter corresponding to the counter associated with the instruction indicates that there is at least one secondary instruction waiting on results of that counter;
   only causing the counter associated with the instruction to be adjusted to indicate that there is a hazard for the primary instruction and forwarding the primary instruction to a queue, in response to determining that the wait counter corresponding to the counter associated with the instruction indicates that there are no secondary instructions waiting on the results of that counter;
   in response to determining that the wait counter corresponding to the counter associated with the instruction indicates that there is at least one secondary instruction waiting on the results of the counter, causing the instruction to be de-scheduled until the wait counter corresponding to the counter associated with the instruction indicates that there are no secondary instructions waiting on the results of the counter;
   in response to forwarding a secondary instruction to a queue preceding an appropriate instruction pipeline, causing the value of each wait counter corresponding to the counter associated with a primary instruction from which the instruction depends to be adjusted to indicate that an additional secondary instruction is waiting on the results of the counter; and
   in response to detecting at a queue that a secondary instruction has been forwarded to an instruction pipeline for execution, cause the value of each wait counter corresponding to the counter associated with a primary instruction from which the secondary instruction depends to be adjusted to indicate that one less secondary instruction is waiting on the results of the counter.

6. The method of claim 1, wherein the instruction comprises:
   a primary instruction field that indicates whether the instruction is a primary instruction from which at least one other instruction is dependent and if so, a counter of the plurality of counters the primary instruction is associated with; and
   a secondary instruction field that indicates whether the instruction is a secondary instruction and if so, the counters of the plurality of counters associated with the primary instructions from which the instruction depends.

7. The method of claim 6, wherein the primary instruction field is configured to hold a number and when the number is a predetermined value, the primary instruction field indicates that the instruction is not a primary instruction and when the number is not the predetermined value the primary instruction field indicates that the instruction is a primary instruction and the number identifies the counter associated with the primary instruction.

8. The method of claim 6, wherein the secondary instruction field is configured to hold a bit mask, wherein each bit of the bit mask corresponds to a counter of the plurality of counters and when a bit of the bit mask is set, that bit indicates that the instruction is a secondary instruction that is dependent on the primary instruction associated with the corresponding counter.

9. The method of claim 6, wherein the received instruction has been generated by a complier configured to identify data hazards within a set of related instructions, allocate a counter to each identified data hazard, and generate computer executable instructions that include primary and secondary instruction fields that are configured based on the identifications and counter allocations.

10. The method of claim 1, wherein causing the instruction to be de-scheduled until each high latency data hazard related to the instruction has been resolved comprises sending a deactivation instruction from the instruction decoder to a scheduler, the deactivation instruction comprising information identifying the instruction and the high latency data hazards related to the instruction.

11. The method of claim 1, wherein a high latency data hazard is a data hazard associated with a primary instruction that is to be executed by an instruction pipeline that has a throughput below a predetermined threshold.

12. The method of claim 1, wherein a low latency data hazard is a data hazard associated with a primary instruction that is to be executed by an instruction pipeline that has a throughput above, or equal to, a predetermined threshold.

13. The method of claim 1, wherein each secondary instruction is to be executed in a different instruction pipeline of the plurality of instruction pipelines than the primary instruction from which it depends.

14. A parallel processing unit configured to perform the method as set forth in claim 1.

15. A method of manufacturing, using an integrated circuit manufacturing system, an integrated circuit embodying a parallel processing unit configured to perform the method as set forth in claim 1.

16. A non-transitory computer readable storage medium having stored thereon a computer readable dataset description of an integrated circuit that, when processed in an integrated circuit manufacturing system, causes the integrated circuit manufacturing system to manufacture an integrated circuit embodying a parallel processing unit configured to perform the method as set forth in claim 1.

17. An integrated circuit manufacturing system configured to manufacture an integrated circuit embodying a parallel processing unit configured to perform the method as set forth in claim 1.

18. An integrated circuit manufacturing system comprising:
   a computer readable storage medium having stored thereon a computer readable integrated circuit description that describes a parallel processing unit configured to perform the method as set forth in claim 1;
   a layout processing system configured to process the integrated circuit description so as to generate a circuit layout description of an integrated circuit embodying the parallel processing unit; and
   an integrated circuit generation system configured to manufacture the integrated circuit embodying the parallel processing unit according to the circuit layout description.

* * * * *